US010948410B2

(12) United States Patent
Stolow et al.

(10) Patent No.: US 10,948,410 B2
(45) Date of Patent: Mar. 16, 2021

(54) OPTICAL IMAGING OF MINERAL SPECIES USING HYPERSPECTRAL MODULATION TRANSFER TECHNIQUES

(71) Applicant: NATIONAL RESEARCH COUNCIL OF CANADA, Ottawa (CA)

(72) Inventors: Albert Stolow, Ottawa (CA); Patrick H. J. Mercier, Ottawa (CA); Andrew Ridsdale, Ottawa (CA)

(73) Assignee: NATIONAL RESEARCH COUNCIL OF CANADA

( * ) Notice: Subject to any disclaimer, the term of this patent is extended or adjusted under 35 U.S.C. 154(b) by 3 days.

(21) Appl. No.: 16/465,923

(22) PCT Filed: Nov. 23, 2017

(86) PCT No.: PCT/CA2017/051399
§ 371 (c)(1),
(2) Date: May 31, 2019

(87) PCT Pub. No.: WO2018/098565
PCT Pub. Date: Jun. 7, 2018

(65) Prior Publication Data
US 2020/0124530 A1    Apr. 23, 2020

Related U.S. Application Data

(60) Provisional application No. 62/429,388, filed on Dec. 2, 2016.

(51) Int. Cl.
*G01N 21/63*  (2006.01)
*G01N 3/44*  (2006.01)
*G01N 21/65*  (2006.01)
*G01J 3/44*  (2006.01)

(52) U.S. Cl.
CPC .............. *G01N 21/636* (2013.01); *G01J 3/44* (2013.01); *G01N 21/65* (2013.01); *G01N 2021/655* (2013.01)

(58) Field of Classification Search
CPC .. G01N 21/65; G01N 21/63; G01N 2021/655; G01J 3/44
See application file for complete search history.

(56) References Cited

U.S. PATENT DOCUMENTS 8,664,595 B2    3/2014    Buhot et al.
9,188,555 B2    11/2015   Owen
(Continued)

FOREIGN PATENT DOCUMENTS

CA    2594444 C    1/2008
GB    1577198 A    10/1980
(Continued)

OTHER PUBLICATIONS

Schouwstra et al., "Developments in mineralogical techniques—What about mineralogists?", Minerals Engineering 24 (2011) 1224-1228.
(Continued)

*Primary Examiner* — Dominic J Bologna

(57) ABSTRACT

A method of imaging a sample containing a target mineral species is provided. The method includes probing the sample with a pump beam and a Stokes beam having a tunable frequency difference, and detecting an optical response of the sample resulting from a transfer of said modulation between the pump beam and the Stokes beam. The probing is scanned spatially and spectrally, thereby obtaining hyperspectral data. Correlation with a known Raman resonance of the mineral species and with anon Raman-resonant contribution to said optical response allows building an image of the sample mapping different species within the sample.

13 Claims, 24 Drawing Sheets

(56) References Cited

U.S. PATENT DOCUMENTS

| | | | |
|---|---|---|---|
| 2006/0012871 A1* | 1/2006 | Funk | G01J 3/06 359/385 |
| 2006/0192969 A1* | 8/2006 | Marks | G01N 21/65 356/451 |
| 2007/0088219 A1 | 4/2007 | Xie et al. | |
| 2009/0073432 A1 | 3/2009 | Jalali et al. | |
| 2010/0046039 A1 | 2/2010 | Xie et al. | |
| 2010/0188496 A1 | 7/2010 | Xie et al. | |
| 2012/0089030 A1 | 4/2012 | Guze et al. | |
| 2013/0321792 A1* | 12/2013 | Shapiro | G01N 21/65 356/30 |
| 2014/0117231 A1 | 5/2014 | Owen et al. | |
| 2014/0117234 A1 | 5/2014 | Owen | |
| 2014/0218726 A1* | 8/2014 | Cheng | G01J 3/02 356/301 |

FOREIGN PATENT DOCUMENTS

| | | |
|---|---|---|
| WO | 20100114877 A2 | 10/2010 |
| WO | 2011163353 A2 | 12/2011 |
| WO | 2012057875 A1 | 5/2012 |
| WO | 2012102833 A2 | 8/2012 |

OTHER PUBLICATIONS

Berto et al."Background-Free Stimulated Raman Spectroscopy and Microscopy", Physical Review Letters, 112, 053905 (2014), 1-5.
Andreana et al., "Multimodal Nonlinear Optical Microscopy, From Biophotonics to Geophotonics", Mar. 2014, 43-49.
Gu et al., "The Value of automated mineralogy", Minerals Engineering, 58, 2014, 100-103.
Burruss et al., "Unraveling the complexity of deep gas accumulations with three-dimensional multimodal CARS microscopy", Geology, Dec. 2012, v.40, No. 12, 1063-1066.
Baum, "Ore characterization, process mineralogy and lab automation a roadmap for future mining", Minerals Engineering, 60, 2014, 69-73.
PCT Form, IB/373, International Preliminary Report on Patentability, dated Jun. 4th, 2019m 5 pages.
Supplementary European Search Report for European Patent Application No. 17876812, dated Jun. 8, 2020.

* cited by examiner

OPTICAL IMAGING OF MINERAL SPECIES USING HYPERSPECTRAL MODULATION TRANSFER TECHNIQUES

CROSS-REFERENCE TO RELATED APPLICATIONS

This application is the 35 U.S.C. § 371 national stage application of International Application No. PCT/CA2017/051399, filed on Nov. 23, 2017, which claims priority of U.S. Provisional Patent Application No. 62/429,388, filed on Dec. 2, 2016, both of which are incorporated herein by reference in their entirety.

TECHNICAL FIELD

The technical field generally relates to optical imaging of samples containing one or more mineral species and makes use of hyperspectral data from modulation transfer techniques such as Stimulated Raman Scattering.

BACKGROUND

In the mining industry, a number of automated mineralogy methods and tools are now widely used for ore characterization, process design and process optimization. The ability to microscopically image and rapidly identify mineral grain types in processed ore and whole-rock samples allows mining operations to maximize the return on their investment QEMSCAN, MLA and related automated mineralogy techniques developed for the mining industry use scanning electron microscopy (SEM) in combination with backscattered electrons and characteristic X-rays emitted upon impinging an electron beam on the sample. Together, these techniques are used for imaging the sample and to determine its mineralogical and chemical composition and perform mineral liberation analysis. Infrared, near infrared and other spectroscopy and imaging methods can identify minerals in dry samples whereas Raman imaging applies only to non-fluorescent samples. Optical microscopy and X-ray diffraction are also used routinely to determine accurately the minerals contained in a sample.

Existing methods (e.g. QEMSCAN, optical mineralogy, Raman etc.) for automated and/or quantitative mineralogy typically require extensive sample preparation in order to obtain accurate results. There is presently no viable approach to performing rapid-turn-around 3D mineral-specific imaging for mineral processing analytics. Current methods do not simultaneously yield particle size distributions and mineral deportment (chemical/mineral-specific analysis as a function of particle size). Existing methods involve extensive sample preparation (e.g. drying of the sample, embedding in resin, polished sections) which greatly increases turn-around time and modifies the original sample properties. Furthermore, 3D mineral-specific imaging is more valuable in mineral processing analytics than current 2D imaging methods.

There remains a need for improved optical microscopy tools and techniques for imaging mineral samples.

SUMMARY

In accordance with one aspect, there is provided a method of imaging a sample containing one or more target mineral species.

The method includes the following steps:
a) generating a pump beam and a Stokes beam comprising of a train of short pulses and having a tunable frequency difference;
b) imposing a modulation on one of the pump beam and Stokes beam;
c) probing an array of probed regions of the sample with the pump beam and Stokes beam jointly, said probing comprising varying the frequency difference between the pump beam and Stokes beam over a frequency range encompassing at least one known Raman resonance of the mineral species, said probing further comprising detecting, for each frequency of said frequency range for each of the probed regions of said array, an optical response of the sample resulting from a transfer of said modulation between the pump beam and the Stokes beam, thereby obtaining hyperspectral data including a spectrum of said optical response over said frequency range for each of the probed regions;
d) identifying a first subset of the probed regions containing the target mineral species through a correlation of the hyperspectral data with the at least one known Raman resonance of the mineral species;
e) identifying a second subset of the probed regions containing a non-target species through a correlation of the hyperspectral data with a non Raman-resonant contribution to said optical response;
f) building an image of the sample by mapping the first and second subsets of the probed regions thereon.

In some implementations, the array of probed regions of the sample is a bi-dimensional spatial array, whereas in other implementations the array of probed regions of the sample is a tri-dimensional spatial array.

In some implementations, the probing of step c) may include the substeps of:
i. probing one of the probed regions of said array with the pump beam and Stokes beam;
ii. varying the frequency difference between the pump beam and Stokes beam over said frequency range and detecting said optical response of the sample; and
iii. spatially scanning the pump beam and Stokes beam over said sample and repeating substeps i. and ii. for each of the remaining probed regions of said array.

Alternatively, the probing of step c) may include the substeps of:
i. fixing the frequency difference between the pump beam and Stokes beams to said at least one known Raman resonance of the mineral species;
ii. spatially scanning the pump beam and Stokes beam over the array of probed regions and detecting said optical response of the sample; and
iii. spectrally scanning the frequency difference over said frequency range and repeating substeps i. and ii for each frequency difference within said frequency range.

The step of building an image may involve assigning respective first and second colors to the first and second subsets of the probed regions.

In some implementations, the method may include a step of determining the chemical identity of said non-target species. For example, the step of determining a chemical identity of said non-target species may involve a step of predetermining said chemical identity from a similar sample using an imaging or a non-imaging mineralogical technique, and associating the non Raman-resonant contribution said chemical identity. The method may further include associating the non Raman-resonant contribution to said optical response with at least one of a cross-phase modulation (XPM) contribution, a thermal lensing (TL) contribution, and non-linear absorption contribution.

In some implementations, the method may include identifying an additional subset of the probed regions containing an additional mineral species through a correlation of the corresponding spectrum with at least one known Raman resonance of the additional mineral species within said frequency range, and mapping the additional subsets of the probed regions on said image.

In some implementations, steps a) through e) may be repeated for an additional mineral species, thereby identifying an additional subset of the probed regions containing the additional mineral species, and mapping the additional subsets of the probed regions on said image.

Other features and aspect of the invention will be better understood upon a reading of the description of embodiments thereof with reference to the appended drawings.

DETAILED DESCRIPTION

Figure 1:
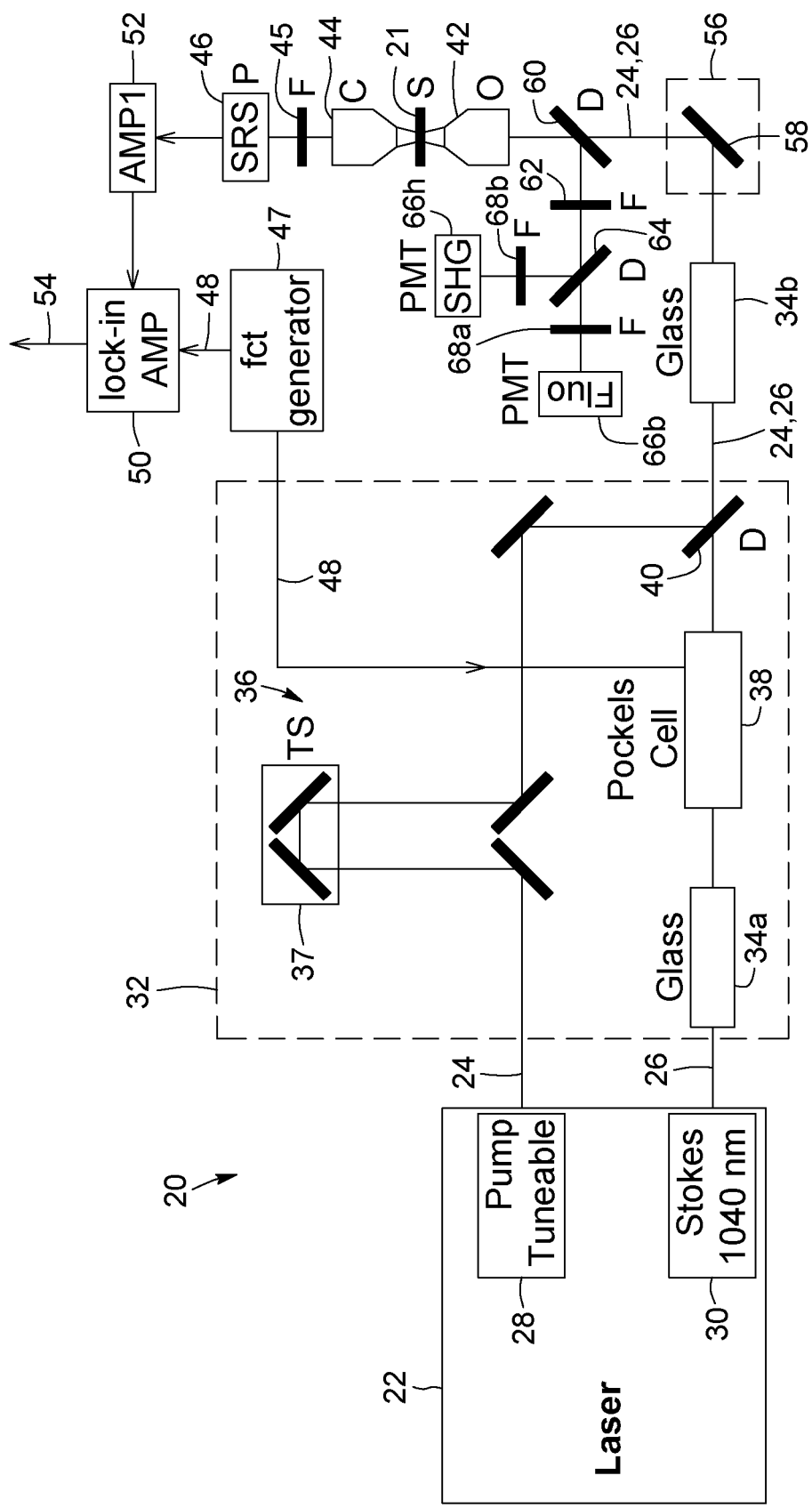
FIG. 1 is a schematized representation of a multimodal hyperspectral imaging system using a transfer of modulation scheme according to one embodiment.

In accordance with one aspect of the present description, there is provided a method of imaging a sample containing one or more mineral species.

In various implementations, the sample may be of mining origin in the general sense that it contains natural materials from the ground. Mining samples and ground-extracted samples typically include at least one valuable ore mineral species mixed with gangue consisting of unwanted or valueless rocks and minerals, as well as non-mineral species such as organic material, bitumen, etc. In accordance with some embodiments, as explained below, the present method may be used to image at least one of the mineral species present in the sample by making use of a modulation transfer technique. Advantageously, embodiments of the method may take under consideration both the Stimulated Raman Scattering contribution as well as linear and/or non-linear non-Raman-resonant contributions to the modulation transfer in imaging the sample. In accordance with some variants, the method may provide a composite image representing the resonant and non-resonant contributions as well as additional characteristics of the imaged mineral species or representing other constituents of the sample, minerals or otherwise. In some implementations, different linear and/or non-linear optical processes are exploited to provide different information. More details on implementations of the present method will also be provided further below.

The method according to the present description may be of use in various fields of application, including for example Earth sciences, mineralogy, petrology, geochemistry, chemistry and materials science, as well as in the fields of petroleum and mineral resources exploration, development and exploitation. Examples of samples that may be imaged according to the present method may therefore include various types of samples comprising rocks and minerals, either (i) from drill cores collected during petroleum and mineral exploration, (ii) from surface or underground mining processes to excavate the ore and gangue from the ground, (iii) from mineral processing operations to separate the ore from the gangue, (iv) from metallurgical or other mineral treatment processes to extract the desired valuable components (e.g. metallic elements, bitumen, oil, gas etc.) from the ore, or (v) from waste streams generated during mining, mineral processing and extractive metallurgy or other mineral treatment operations.

It will be understood that the term "imaging" refers to building an image representative of one or more features of interest as an array of image elements. According to some variants, the image resulting from the imaging of the present method may be a 2D (pixels) or a 3D (voxels) array, as demonstrated below.

In embodiments of the present method, one or more of the mineral species probed for in the sample has a known Raman resonance. A Raman resonance may be understood as an electronic, vibrational and/or rotational transition resulting from the spontaneous or stimulated inelastic scattering of light by a material, mineral or molecule. Different species have specific Raman resonances that are well documented and known in the art and are used to determine the chemical identity of the species of interest. For a given chemical or mineral species, therefore, known experimentally determined Raman spectra can be found in literature. Equally, Raman spectroscopy can be used to identify minerals and their mass percent concentration in the sample of interest. Furthermore, the shifts and broadening of Raman peaks and their polarization (linear dichroism) can indicate strain and disorder in solids, used to determine both the mineral chemical identity and its phase.

Figure 2A:
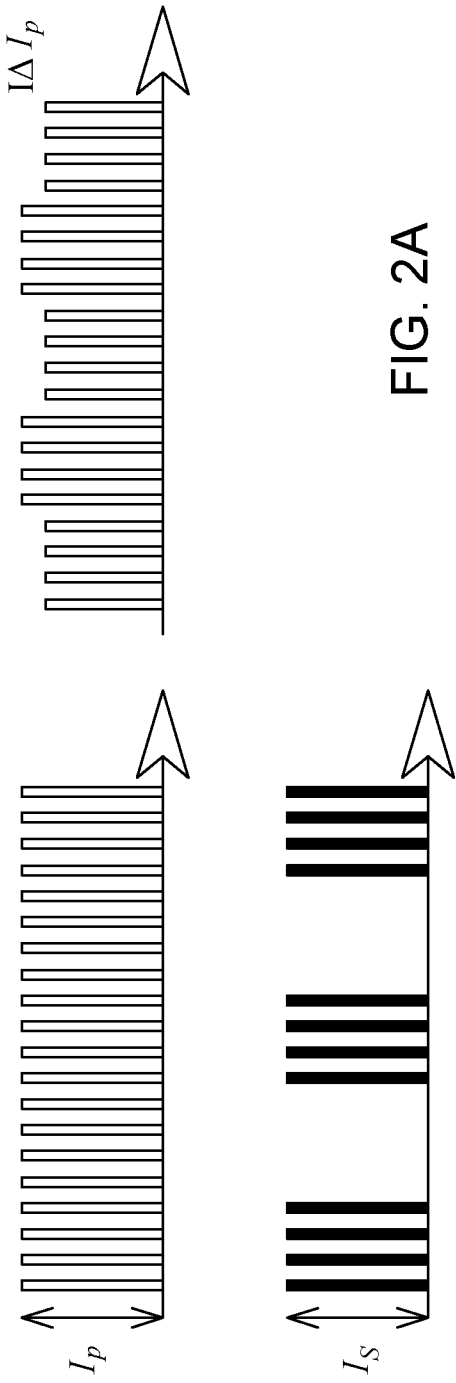
FIG. 2A illustrates a Stimulated Raman Loss (SRL) scheme where the Stokes beam intensity is modulated and, when a Raman mode is resonantly excited, the modulation intensity is transferred to the pump beam.
Figure 2B:
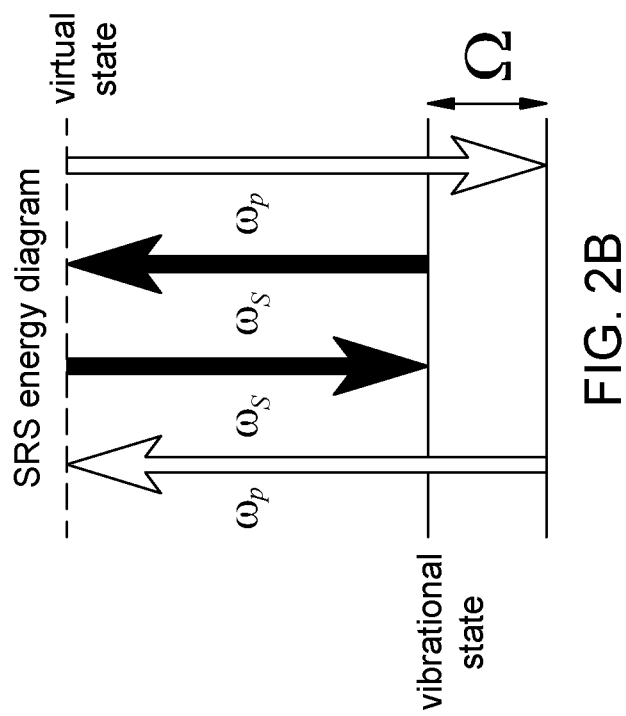
FIG. 2B shows the energy diagram of the SRS process.

In some implementations, as explained in details below, a modulation transfer technique is used to obtain a spectrum of the optical response of the sample for each probed region of the sample. The modulation transfer technique is based on the interaction of two laser beams at the pump frequency $\omega_P$ and the so-called Stokes frequency $\omega_S$ with their frequency difference $\Delta\omega=\omega_P-\omega_S$ varied over a frequency range encompassing the known Raman resonance of a mineral species. A Stimulated Raman Scattering (SRS) contribution to the optical response of the sample will create a peak, i.e. a resonance, at any frequency difference corresponding to the Raman resonance of a mineral species present in the region of sample probed by the pump beam and the Stokes beam jointly. By imposing a modulation on either the pump beam or Stokes beam, a homodyne or a heterodyne technique can be used to detect a transfer of this modulation to the other beam through their interaction with the sample. To efficiently detect this modulation, one of the laser beams is typically modulated at MHz RF (radiofrequency) frequencies while the transfer of modulation to the other beam is detected using a lock-in amplifier or any other narrow band RF detection method, including tuned amplifiers. In SRS modality, the modulation transfer signal can be measured either by the loss of the pump signal, termed stimulated Raman loss (SRL), or the gain in the Stokes signal, termed stimulated Raman gain (SRG). FIG. 2A illustrates the Stimulated Raman Loss (SRL) scheme where the Stokes beam intensity is modulated and, when a Raman mode is resonantly excited, the modulation intensity is transferred to the pump beam. FIG. 2B shows the energy diagram of the SRS process. The SRG scheme (not shown) may equally be implemented.

Because it is a stimulated process, SRS imaging is typically much faster than spontaneous Raman implementations and it is also relatively immune to sample fluorescence—a severe limitation in conventional Raman imaging.

The method further involves analysing the optical response of the sample outside of the frequency of the known Raman resonance to determine if a non Raman-resonant contribution is present. Advantageously, embodiments of the present invention make use of the measurement of the other specific processes which lead to a modulation transfer between the pump beam and the Stokes beam. Outside of SRS, these processes include linear scattering processes such as Rayleigh or spontaneous Raman scattering, as well as non-linear scattering processes such as cross-phase modulation (XPM) and Thermal Lensing (TL), as well as non-linear absorption processes such as Two-Photo Absorption (TPA), Ground State Depletion (GSD) and Excited State Absorption (ESA).

In some embodiments, the present method may also extract imaging information from other nonlinear imaging modalities known in the art such as Second Harmonic Generation (SHG), Third Harmonic Generation (THG), Two-Photon Excitation Fluorescence (TPEF), Coherent Anti-Stokes Raman Scattering (CARS) and the like.

Exemplary Imaging System

Referring to FIG. 1, there is shown a hyperspectral modulation transfer imaging system 20 which may be used to carry out the steps of the present method. It will be readily understood that this system is presented by way of example only and that other configurations may readily be used to carry out the method as described herein.

The illustrated hyperspectral modulation transfer imaging system 20 includes a light-generating module 22 configured to generate the two separate but synchronized pulsed coherent light beams, that is, a pump beam 24 and a Stokes beam 26. In one embodiment, a tunable laser 28 may be used to generate the pump beam 24 such that its optical frequency (or wavelength) can be controllably changed, whereas a laser with a fixed spectral output 30 may be used to generate the Stokes beam at a fixed frequency. In other embodiments, the frequency of the pump beam 24 may be kept fixed, whereas the frequency of the Stokes beam 26 is tuned. In one example of implementation, a femtosecond laser system (InSight DS+, Spectra-Physics, USA) was used to produce both the pump and the Stokes beams 24 and 26. The Stokes beam 26 was the fixed output with a central wavelength of 1040 nm and a transform-limited pulse duration of 180 fs (linearly stretched to ~1.1 ps). The pump beam 24 was tunable over the range 680-1300 nm. The spectral bandwidth of the pump beam 24 corresponded to a transform limited pulse duration of ~150 fs (linearly stretched to ~1.4 ps).

The imaging system 20 further includes a spectral scanning module 32 configured for scanning the frequency difference between the Stokes beam and the pump beam, preferably in a rapid manner. Rapid and broad range spectral scanning may be achieved in this implementation. In one implementation, the spectral scanning module 32 uses a chirped (linearly stretched) pulse spectral focusing arrangement. In this configuration, the pulses of both the pump and the Stokes beams are linearly chirped, for example by providing a fixed optical path length of dispersive glass 34a, 34b in the path of to the pump and Stokes beam (60 and 85 cm of SF11 glass was used in the exemplary implementation, respectively), inducing a positive chirp. Other optical methods using prisms, gratings or optical pulse shapers may also be used to induce positive or otherwise phase-controlled chirps. A delay line 36 is provided in the path of the pump beam 24, in the illustrated variant, although in another variant the delay line may be provided in the path of the Stokes beam 26. The delay line 36 may for example include a translation stage 37. By changing the time delay between the pump beam 24 and Stokes beam 26, the instantaneous frequency difference is varied, allowing the selection of a specific Raman frequency or to rapidly acquire a continuous scan over a specified frequency range.

The imaging system 20 further includes a modulator 38 for modulating one of the pump beam 24 and Stokes beam 26. The optical property being modulated may be the amplitude, polarization, frequency and/or phase of either the pump or Stokes beams. In the illustrated system, the modulator 38 is embodied by a Pockels cell (350-160, Conoptics, USA) provided in the path of the Stokes beam 26. It will be readily understood that although the modulator is shown here as acting on the Stokes beam, 24, in other variants it may act on the pump beam 24. In this example the Pockels cell (or, equivalently, an acousto-optic modulator or any other optical modulator) induced a square wave (or other shape) amplitude modulation of the Stokes beam 26 at a frequency of 1.4 MHz. Other implementations may involve amplitude, phase, polarization and/or frequency modulation methods.

The imaging system 20 further includes a beam combiner 40 combining the pump beam 24 and the Stokes beam 26 downstream the delay line 36 and the modulator 38. In one example a dichroic mirror (1040 dmbp, Chroma, USA) was used as a collinear, co-propagating beam combiner 40. Other collinear, co-propagating beam combiner examples could include polarizer-based schemes. In other variants, a small angle (non-collinear) co-propagation scheme can be implemented.

The imaging system 20 is further configured to probe a sample 21 with the combined pump beam 24 and Stokes beam 26. In the illustrated embodiment, the combined pump and Stokes beams 24, 26 traverse a closely spaced pair of mirrors mounted on galvanometers 58. The mid-point of the mirror pair rests at one the focus of a scan lens (not shown). The other focal plane of the scan lens is matched to the image plane on the camera side port of a commercial microscope frame (not shown; in this implementation it is an IX-71, Olympus, Japan). This essential configuration is well known in the art as laser scanning microscopy (LSM). The pump and Stokes laser beams 24, 26 are focused onto the sample through a first microscope objective 42 (in this implementaion, a UPlanSapo, 20×, NA 0.75, Olympus, Japan). In LSM, imaging occurs through the software co-ordination of the electronic signals directing the scanning galvanometers 58 to produce a raster pattern on the sample, with the integration of the signal during the time the focused beams transit one pixel area in the sample. Images are built up serially pixel by pixel and so consist of a number of individual measurements The interaction of the pump beam 24 and the Stokes beam 26 at the sample 21 leads to a modulation transfer between the pump beam and the Stokes beam, which can be detected using a homodyne or heterodyne technique such as described below. The detected optical response may include SRS contributions from mineral species in the sample, as well as non Raman-resonant contributions such as XPL, TL, TPA, GSD and ESA. All of these processes may lead to the detection of a change in the detected modulation transfer signal.

In the illustrated embodiment of FIG. 1, as the imaging system 20 is configured in accordance with a SRS detection scheme, the resulting light from the interaction of the combined pump beam 24 and Stokes beam 26 includes a modulated pump beam 24', to which the modulation initially imposed on the Stokes beam 26 has been transferred. The illustrated imaging system 20 includes a second microscope objective 44 (LUMPlanFI/IR, 40×, NA 0.8w, Olympus, Japan) collecting the modulated pump beam 24' in the forward direction and sending the modulated pump beam 24' into a photodiode 46 (FDS10X10, Thorlabs, USA) after being filtered by a filtering module 45 (here embodied by two different optical filters, BrightLine 850/310, Semrock, USA and 1064-71 NF, Iridian, Canada). The modulation transfer optical response may be measured as follows: a function generator 47 (DS345, Stanford Research Systems, USA) produces the modulation signal 48 for the Pockels cell 38. In this implementation, the modulation reference signal 48 is also sent into a lock-in amplifier 50 (UHFLI, Zurich Instruments). Other narrow band RF detection methods may also be implemented. The signal from the photodiode 46 is amplified and band-pass filtered by a transimpedance amplifier 52 (DHPCA-100, Femto Messtechnik GmbH, Germany) which provided the signal input to the lock-in amplifier 50. The relative phase between the optical signal and the reference from the function generator is preferably adjustable, allowing optimization of different signal modalities as described below. The lock-in amplifier 50 then extracts an analog output representing the response signal 54 at the function generator frequency. In the experiments performed using this system, a time constant of 20 ps was used. A two-phase lock-in amplifier (such as the Zurich Instruments instrument used here) is able to provide output modulated signals at different phases relative to the reference signal. The image recorded is derived from the analog output 54 of the lock-in amplifier that is proportional to the detected voltage modulation at the reference frequency and a specific phase. In the SRL configuration, a relative phase is set such that the measured pump signal decreases when the modulated Stokes beam increases and signals with this phase have a positive voltage (above a threshold) at the lock-in analog output. A modulation which is 180 degree out-of-phase with this indicates a gain in pump signal when the modulated Stokes beam is increased, indicating other (non Raman-resonant) modalities. In the SRG configuration, a relative phase is set such that the measured Stokes signal increases when the modulated pump beam decreases. Responses in a second channel are proportional to the quadrature response from the sample at the modulation frequency. These mean that the non Raman-resonant responses may have some temporal hysteresis relative to the SRS response which is a measurable fraction of the inverse modulation frequency. These can be used to simultaneously monitor other imaging (non Raman-resonant) modalities during SRS imaging.

Optionally, the imaging system 20 may be further configured to obtain information from optical processes which are not based on a transfer of modulation. By way of example, the illustrated SRS imaging system 20 of FIG. 1 allows for the additional collection of both fluorescence and SHG signals. In the backward direction, a first dichroic mirror 60 (720DCXXR, Chroma, USA) can direct both back-reflected SHG and fluorescence signals through a shortpass filter (750SP, Chroma, USA). These are separated with a second dichroic mirror 64 (540 DCRX, Chroma, USA) and are each detected by a respective photomultiplier tube 66a, 66b after passing through a corresponding filter 68a, 68b (520/10, Chroma, USA for the SHG channel, HQ630/140 for the fluorescence channel). It will be readily understood that this configuration is shown by way of example only and that other configurations allowing the acquisition of signals from various linear optical and/or nonlinear optical processes may be envisioned.

It will be seen from the description below that embodiments of the method described herein may allow the use of SRS to image samples containing minerals while alleviating the drawbacks inherent to conventional approaches.

Imaging Method

Figure 3:
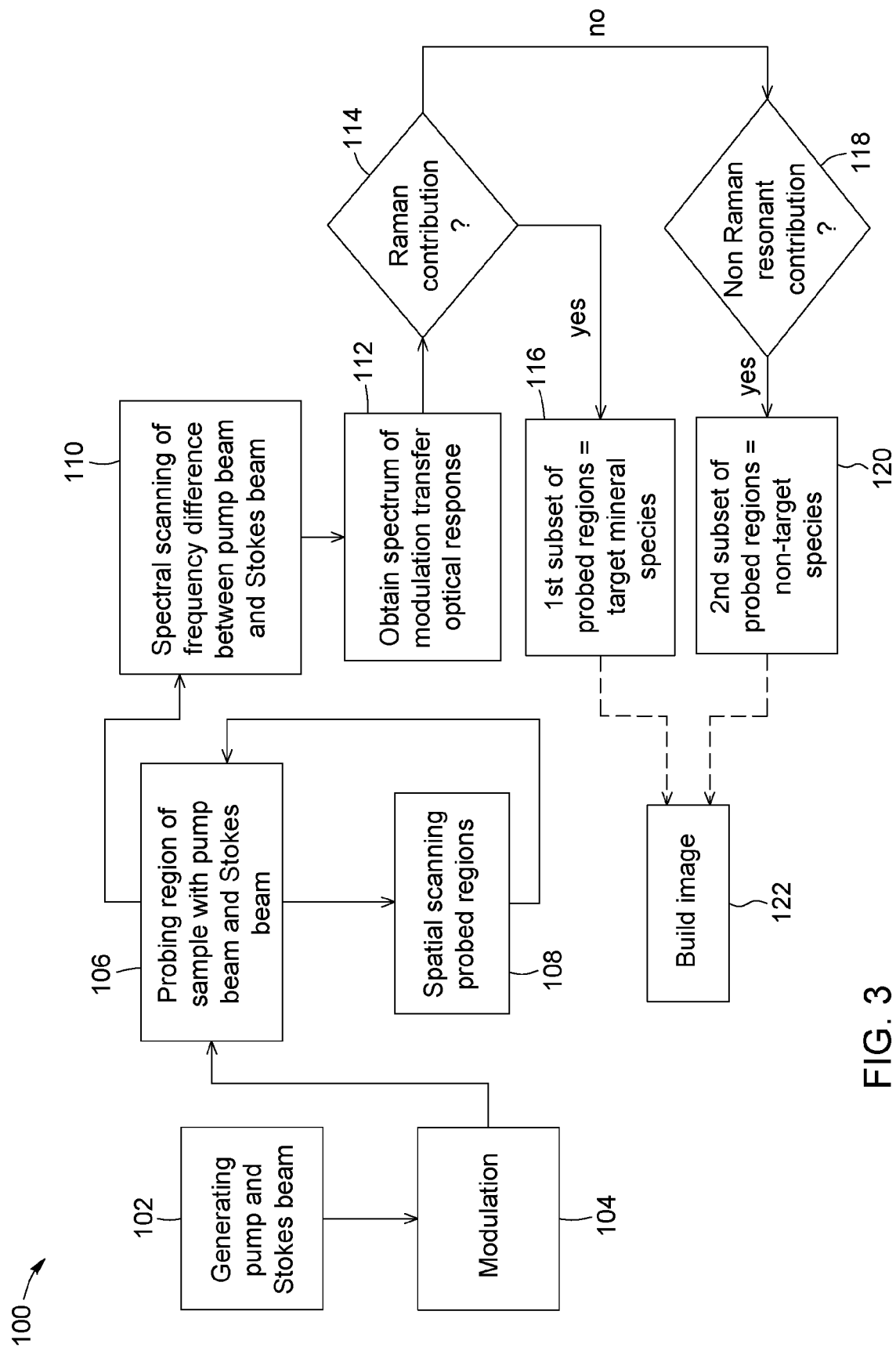
FIG. 3 is a flow chart of an imaging method according to one embodiment.

With reference to FIG. 3, there is shown a flow chart of a method 100 of imaging a sample containing a target mineral species according to one embodiment.

It will be readily understood that the expression "target mineral species" refers to a species which is known or suspected of being present within the sample, the present method allowing its identification and location across the sample. The target mineral species has a Raman spectrum which is known at least partially. In other words, as mentioned above, the inelastic scattering of light by molecules of the target mineral species leads to electronic, vibrational and/or rotational transitions resulting in the scattering of light at species-specific wavelengths, resulting in Raman resonances or peaks in the spectrum of the optical response of the material upon excitation by light of a suitable spectral profile. Different species have specific Raman resonances that are well documented and known in the art and are used to determine the chemical identity of the species of interest. For a given chemical or mineral species, therefore, the Raman spectrum can be found in literature. In other variants, one or more Raman resonances for a given species can be predetermined experimentally.

The illustrated method 100 first involves a step 102 of generating a pump beam and a Stokes beam having a tunable frequency difference. This may for example be achieved using a light generating module such as described above or devices or assemblies of devices equivalent thereto. In one embodiment, two lasers may be used to respectively generate the pump beam and the Stokes beam, at least one of these lasers being tunable, that is, having an optical frequency (or wavelength) that can be controllably changed. In another variant, a single laser having dual beam capabilities or a sufficiently broad bandwidth may be used to generate both the pump beam and the Stokes beam, such as discussed in the exemplary imaging system described above.

The terms "pump beam" and "Stokes beam" are meant to be understood as they are commonly used in the field of stimulated Raman scattering, such as the CARS and SRS techniques. Referring again to the energy diagram of FIG. 2B, the expression "pump beam" is generally understood to refer to the one of the two laser light beams having the higher optical frequency. The expression "Stokes beam" is generally understood to refer to the one of the two laser light beams having the lower optical frequency. These names are historically related to a "Stokes" Raman scattering process where the excitation light is re-scattered at a lower frequency due to interaction with a sample, although one skilled in the art will readily understood that the origin of this terminology is not limitative to its current use on the art. The frequency difference between the two beams is tuned in order to obtain the Raman spectrum. It is the input of these two beams that results in the relatively higher SRS and CARS signals compared to spontaneous Raman.

As is known in the art of optical microscopy, the pump beam and Stokes beam are generally pulsed light beams, having a pulsewidth and repetition rate suitable for the purposes of the experiment being performed. Typically, light pulses in the femtosecond to picosecond duration range may be used. The tuning of the frequency difference between the two beams may be performed in any manner known to those skilled in the art. In one example, a chirped pulse (spectral focusing) arrangement may be used. In such an approach, the optical pulses of both the pump and the Stokes beams are linearly chirped, that is, the instantaneous optical frequency of the light varies linearly over the duration of a single light pulse. By changing a time delay between both beams, the instantaneous frequency difference between them is varied, allowing users to select a specific frequency or to rapidly acquire a continuous scan yielding the Raman spectrum over a specified frequency range. Other alternatives include longer pulse lasers with tunable wavelengths. Longer pulses reduce stimulated Raman signal but support higher spectral resolution. Spectrally filtered and/or pulse-shape-controlled (amplitude and phase control) of femtosecond lasers may also be used. In some implementations, filtered femtosecond pulses with rapid switching between frequency bands within a broad bandwidth pulse is possible. Spectral narrowing or tuning, without filtering and attendant power loss of femtosecond pulses can also be implemented via nonlinear propagation in optical fibers.

The method 100 next includes a step of imposing 104 a modulation on either the pump beam or the Stokes beam. In various implementations, the modulation may be an amplitude modulation, a polarisation modulation, a time delay or a frequency and/or phase modulation. Polarisation, time delay, frequency and phase modulation schemes have the advantage of keeping the total pump and Stokes laser power through the sample unmodulated. Examples of devices which may be used to impose modulations include a Pockels cell, an acousto-optic modulator, an electro-optic modulator, a pulse-shaper, or the like. As mentioned above, the modulation may be applied to either the pump beam or the Stokes beam. The modulation signal may be a square wave or another suitable shape. The modulation frequency may be in the kHz to MHz range, depending, among other factors, on the noise sources (electronic, laser, mechanical etc.). In one example, using the imaging system described above, a square wave amplitude modulation of 1.4 MHz was applied to the Stokes beam for technical simplicity, although in other variants the pump beam may have been so modulated or other modulation parameters such as polarization, phase or frequency may have been used.

It is to be noted that the time-delay scan implementation that is used for Raman-spectral scanning in spectral-focusing is equivalent to what is widely known as pump-probe spectroscopy. This form of spectroscopy is typically used for measurement of time-evolving processes where one laser pulse (the pump) creates an excitation in the sample material which influences its interaction with the second pulsed (the probe). In a modulation-transfer configuration, the modulated beam pulse creates the excitation in the sample material which influences its interaction with the unmodulated probe. In this manner, the modulation transfer as a function of time delay between pulses measures the decay of the physical process.

Normally, the SRS and CARS responses occur only when the two laser pulses are overlapped in time so that the frequency difference between the chirped pulses is matched to the Raman resonant frequency. However, there are many physical processes whereby the modulation transfer may persist when the unmodulated pulse arrives after the modulated pulse. Depending on the decay time of the process, the signal may be detected in the quadrature channel of the lock-in amplifier. Other signals decays can be detected by increasing the scan range of the delay stage. Measurement at a few stage delays generally characterizes the decay time.

The method 100 next includes a step of probing 106 an array of probed regions of the sample with the pump beam and Stokes beam jointly, that is, impinging both the pump beam and the Stokes beam on a same volume of the sample.

As will be readily understood by one skilled in the art, each probed region corresponds to the volume of a sample where the pump beam and Stokes beam intersect such that the interaction of both beams with the constituents of the sample within this volume leads to an optical response which may be collected and analysed. In some implementations, an imaging system having a resolution of about 0.5 micron radially and 3 microns axially may be used, allowing each probed region to span a volume as small as 0.5 cubic micron. Preferably, the resolution of the imaging system is selected such that each probed region is small enough such that it contains only one constituent species. Spatially scanning 108 the pump and probed beam allows the probing of the optical response of multiple regions of the sample, and the building of an image of its constituents over these regions. In some implementations, the array of probed regions of the sample is a bi-dimensional array, leading to a 2D image, whereas in other implementations the array of probed regions of the sample is a tri-dimensional array, leading to a 3D image. Optical assemblies for the scanning of optical light beams over two or three axes are well known in the art. Raster scanning of one slice of the sample may for example be performed using galvanometer mirrors such as shown in FIG. 1 or by raster scanning the sample stage which is slower due to the mass of the stage. Depth scanning (along the direction of propagation of the pump and Stokes beams) may for example be performed by adjusting the axial distance between the sample stage and the focusing objective (as in the implementation of FIG. 1) or via an adjustable curvature lens.

The method 100 further involves spectral scanning 110, that is, varying the frequency difference between the pump beam and Stokes beam over a frequency range encompassing at least one known Raman resonance of the target mineral species. The optical response of the sample resulting from a transfer of the modulation between the pump beam and the Stokes beam is detected and recorded over the scanned frequency range, providing a spectrum 112 of this optical response for each of the probed regions. All the collected spectra collectively define hyperspectral data.

It will be readily understood that the order in which the spatial and the spectral scanning are performed is immaterial to the collection of the hyperspectral data. Indeed, in one embodiment the method may involve (i) probing one of the probed regions of array with the pump beam and Stokes beam and (ii) varying the frequency difference between the pump beam and Stokes beam over the frequency range and detecting said optical response of the sample. The pump beam and Stokes beam are then spatially scanned over the sample and substeps (i) and (ii) are repeated for each of the remaining probed regions. Alternatively, the method may involve (i) fixing the frequency difference between the pump beam and Stokes beams to the Raman resonance of the mineral species and (ii) spatially scanning the pump beam and Stokes beam over the array of probed regions and detecting the optical response of the sample. The frequency difference is then spectrally scanned over the frequency range and substeps (i) and (ii) are repeated for each frequency difference within the frequency range.

It should be emphasised that the optical response studied though the present method reflects the transfer of modulation between the Stokes beam and the pump beam, as opposed to directly generated signals filtered by wavelength and/or direction of propagation. This may for example be achieved through a lock-in scheme such as described with respect to FIG. 1, where the optical response is measured at the wavelength of the initially unmodulated light beam at the modulation frequency applied to the other beam. In some implementations, the pump beam is modulated, and this modulation is transferred to the Stokes beam through Raman-resonant or other interactions of the sample. In other implementations, the Stokes beam may be modulated and the modulation transferred to the pump beam. It will be understood that the modulation transfer may either be measured as a gain in the unmodulated beam, as is the case in the example of FIG. 1, or as a loss in the modulated beam.

The hyperspectral data can be analysed to determine if the target species is present in each probed region of the sample. Additionally, the modulation transfer optical response may contain additional information which can help locate and identify other constituents of the sample. According to one aspect, the transfer of modulation may originate from two broad categories of optical processes: a Stimulated Raman Scattering (SRS) process, or a non Raman-resonant process.

As explained above, a SRS contribution to the optical response of the sample will create a peak at any frequency difference corresponding to a Raman resonance of a mineral species present within the probed region. As the Raman spectrum of the target mineral species is known, the scanned range of the frequency difference between the pump beam and Stokes beam may be selected to include one or more known Raman resonance of the target mineral species. A correlation 114 of the spectrum obtained for each probed region with one or more known Raman resonances of the mineral species encompassed within the scanned frequency range therefore allows classification of each probed region as consisting predominantly of an particular mineral type. Through such a correlation, a first subset of probed regions known to contain the target mineral species can be identified 116. Known spectral correlation techniques include well known multivariate data analysis techniques such as principal component analysis, singular value decomposition and others.

Figure 4A:
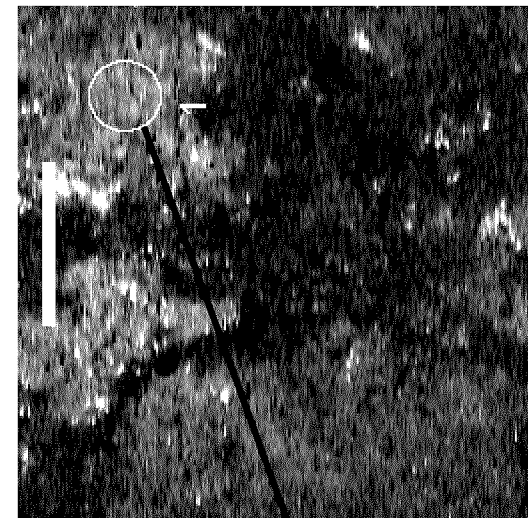
FIG. 4A bright-field transmitted light microscopy image highlighting a probed region.
Figure 4B:
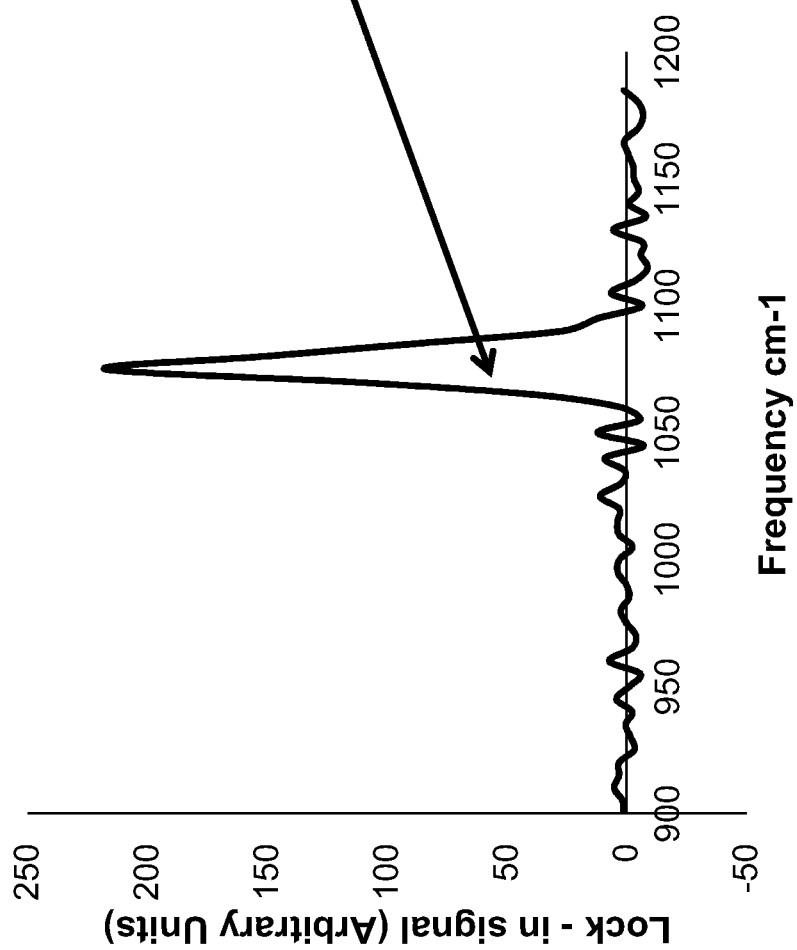
FIG. 4B is a transfer of modulation spectrum of a probed region of the sample showing a Raman resonance of a carbonate mineral.

The frequency range of the spectral scanning is preferably selected to allow an identification of a contribution of the species to the SRS signal over non Raman-resonant background signal contributions around the same frequency. By way of example, FIG. 4A displays a bright-field transmitted-light image of a polished carbonatite rock sample. The transfer of modulation optical response of the probed region labelled 1 was scanned over a frequency range between about 900 cm$^{-1}$ and 1200 cm$^{-1}$. Suppose the target mineral species is embodied by carbonate minerals. Carbonate minerals such as dolomite $CaMg(CO_3)_2$ and/or ankerite $Ca(Fe_xMg_{1-x})(CO_3)_2$ are known to have a Raman resonance around about 1080 cm$^{-1}$. The obtained spectrum is shown in FIG. 4B, where a clear carbonate Raman peak appear above the background at the expected frequency. Probed region 1 can therefore be identified as part of the first subset of probed regions associated with the target mineral species.

Typically, other contributions to the transfer of modulation optical response are considered background to an SRS experiment, which requires mitigation. In the present method, in accordance with an advantageous implementation thereof, the non Raman-resonant contribution is used to obtain additional information on the composition of the sample and to incorporate this information in the resulting image. By making a limited number of modulation transfer measurements (changing the wavelength, time delay, polarization etc.) along with non modulation transfer channels such as SHG or TPEF, embodiments of the present method may allow the classification of the main mineral phases in the image.

Figure 5A:
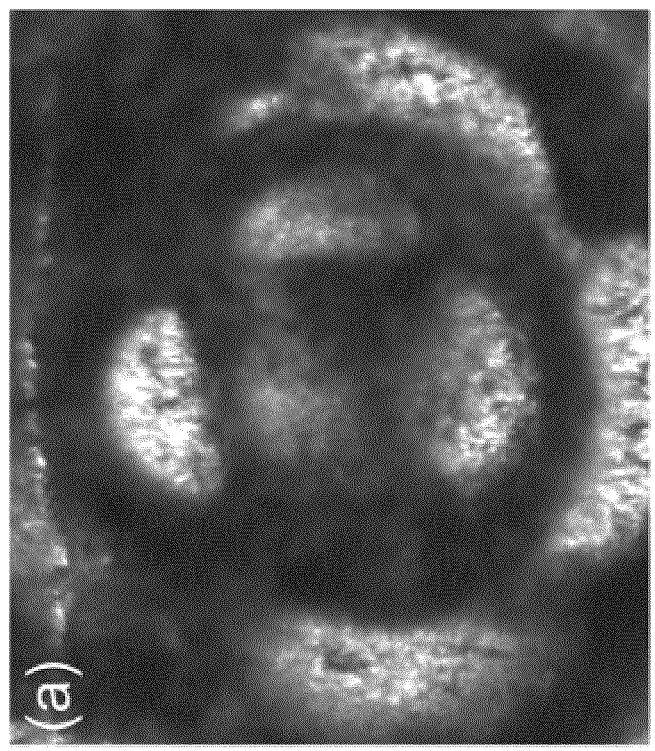
FIG. 5A is a bright-field transmitted light microscopy image of a fossil sample containing foraminiferum cemented by calcite.
Figure 5B:
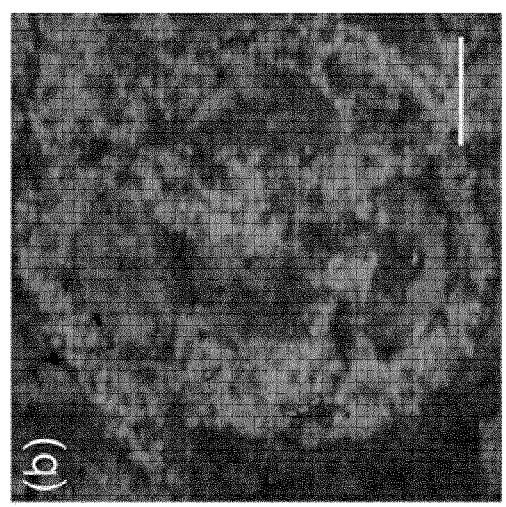
FIG. 5B shows an unprocessed SRS image recorded at the 1088 $cm^{-1}$ resonance Raman peak of calcite.
Figure 5C:
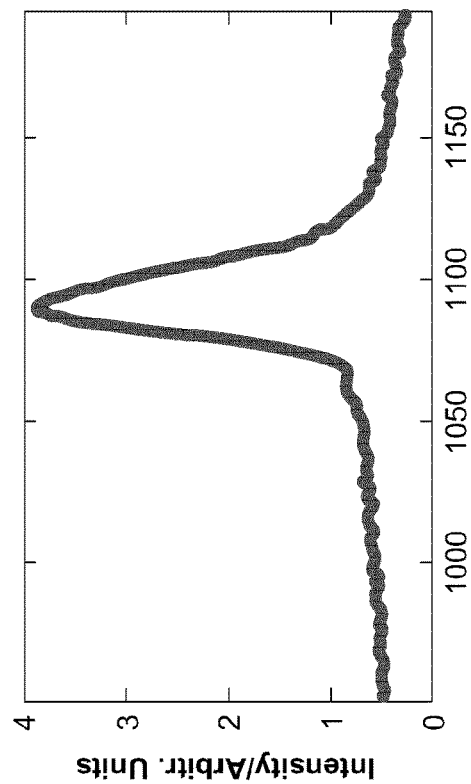
FIG. 5C shows a spectrum of a probed region containing calcite as confirmed by the presence of a sharp peak centered at 1088 $cm^{-1}$.
Figure 5D:
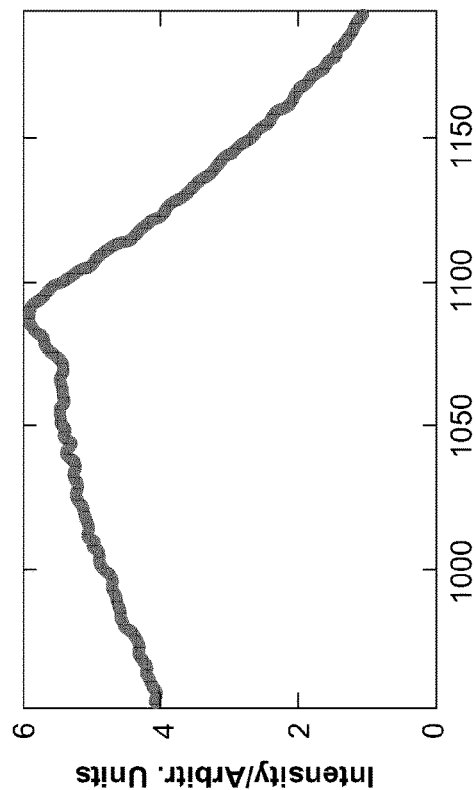
FIG. 5D shows a spectrum of a probed region containing a material other than calcite as evident from a predominantly non-resonant response.

By way of example, FIGS. 5A to 5G show images and data obtained through an embodiment of the present method for a fossil sample containing foraminiferum cemented by calcite. In this experiment, the wavelength of the pump light beam was tuned to 934 nm and the frequency range of the spectral scanning was selected to probe the calcite Raman resonance at 1088 cm$^{-1}$. A bright-field transmitted light microscopy image, shown in FIG. 5A, illustrates the area of the sample used for this analysis. FIG. 5B shows an unprocessed SRS image recorded at the 1088 cm$^{-1}$ resonance Raman peak. As can be observed, there are bright regions which one might be tempted to assign uniquely to calcite, due to being on the 1088 cm$^{-1}$ resonance. However, it can be demonstrated that the transfer of modulation signal at this wavelength includes both resonant and non-resonant contributions, depending on the probed region. These are not distinguishable via an intensity analysis alone. The chemical identification of the mineral calcite within the area of the sample under study can be confirmed through spectral scanning, as shown in FIGS. 5C and 5D. The probed regions corresponding to the spectra of FIGS. 5C and 5D are displayed on FIG. 5B. The spectrum in FIG. 5C shows a sharp peak centered at 1088 cm$^{-1}$, confirming the presence of calcite. In contrast, the spectrum of FIG. 5D reveals a predominantly non-resonant response which therefore cannot be due to calcite.

In accordance to an aspect of the present method, referring again to FIG. 3, a correlation 118 of obtained spectra with a non Raman-resonant contribution to the transfer of modulation optical response is performed and an identification 120 of a second subset of the probed regions containing a non-target species is made. The method then involves building an image 122 of the sample by mapping the first and second subsets of the probed regions thereon.

Figure 5F:
FIGS. 5E and 5F are representations of the second and first sets of probed regions only, respectively.
Figure 5G:
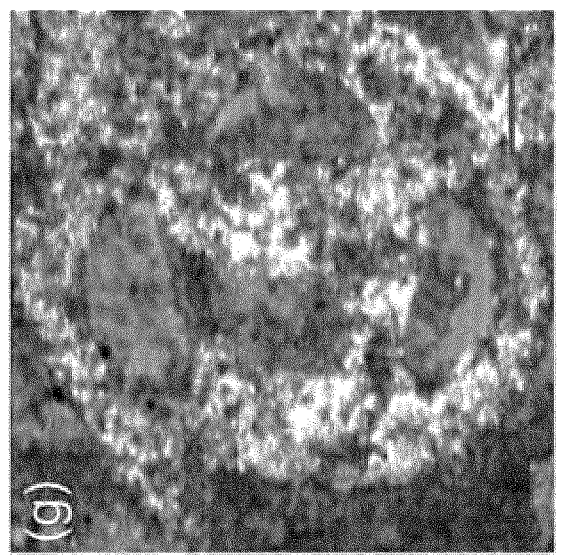
FIG. 5G is a composite image of the sample.
Figure 5E:
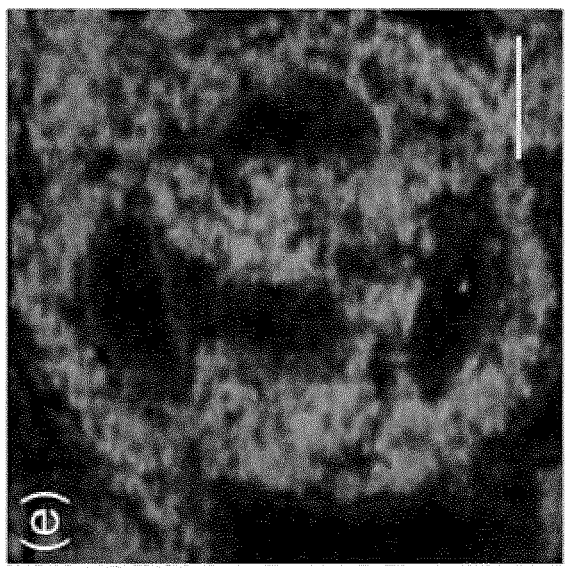

Referring again to FIGS. 5A to 5G, as mentioned above the spectrum obtained for each probed region allows a differentiation of signals correlating to a Raman resonance forming the first set of probed regions, from probed regions of the second set where the resulting spectrum shows a non Raman-resonant contribution. FIG. 5E shows a representation of the second set of probed regions only, in this example obtained by tuning the frequency difference to 1040 cm$^{-1}$ where only the non Raman resonant contribution is present in the spectrum of the corresponding probed regions. FIG. 5F highlights only the first set of probed regions, corresponding to the target mineral species, calcite. In this example, the image of FIG. 5F was obtained by subtracting the resonant SRS image (1088 cm$^{-1}$) from the non-resonant image (1040 cm$^{-1}$). Finally FIG. 5G is the obtained composite image of the sample mapping the first subset of the probed regions (in green), representing calcite, and the subset of the probed regions (in grey), representing a non-target species.

The following physical processes are examples of non Raman-resonant contributions to the modulation transfer between the pump beam and the Stokes beam, however, other non Raman-resonant contributions may also contribute. Some detected signals may have contributions from more than one process.

a. Cross-Phase Modulation (XPM)

Cross-phase modulation is a nonlinear transient scattering process. The interaction of the pump beam with the sample induces a transient refractive index change in the probed region of the sample, which leads to scattering or change in propagation of the Stokes beam.

b. Thermal Lensing (TL)

Thermal lensing, or more generally photothermal processes, is a mechanism of modulation transfer due to a change of temperature of the probed region which transiently impacts its optical properties such as the refractive index. These changes, in turn, influence the propagation of the unmodulated beam.

c. Two-Photon Absorption (TPA)

Two-Photon Absorption refers to the concomitant absorption of a photon from the pump beam and a photon from the Stokes beam. It can impact the modulation transfer optical response if detection is based on a loss of signal in the modulated beam. In this case neither photon has sufficient energy to achieve this with electronic absorption. TPA does only occur during the temporal overlap of the two beams and therefore shows not time dependence at longer time delays between the two beams.

d. Ground State Depletion (GSD)

Ground State Depletion is related to TPA and ESD in that it removes population from the ground state, leading to a change in signal in the unmodulated beam. In terms of a pump-probe implementation, the time scale of this process can be variable.

e. Excited State Absorption (ESA)

Excited State Absorption is a special case of TPA where one of the two beams is itself resonant.

Figure 9B:
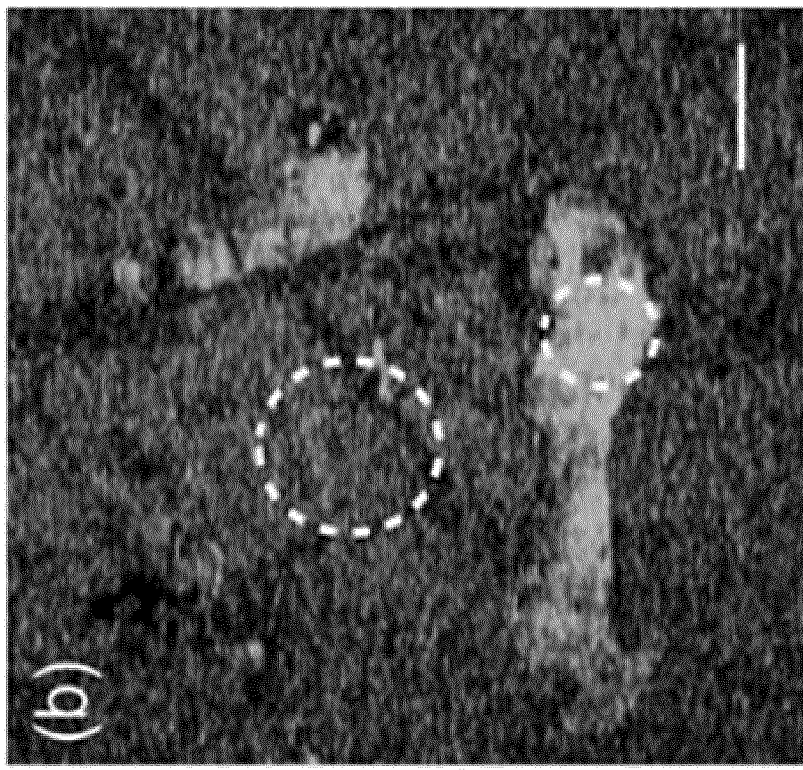
FIG. 9B is an SRS image showing both minerals as identified through a single set of hyperspectral data.
Figure 9A:
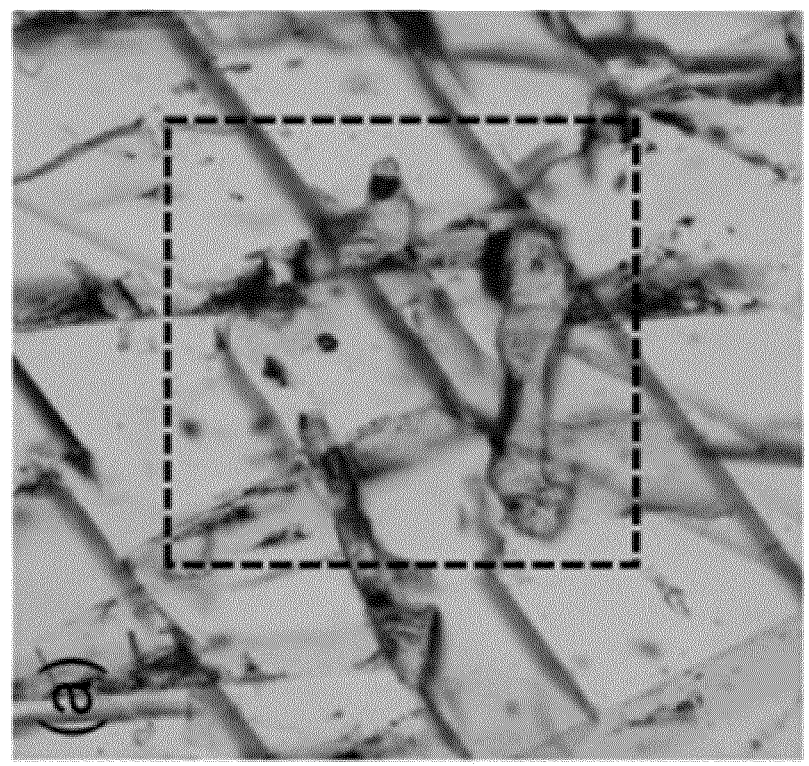
FIG. 9A is a bright-field transmitted light microscopy image of a sample containing anhydrite and calcite.
Figure 9C:
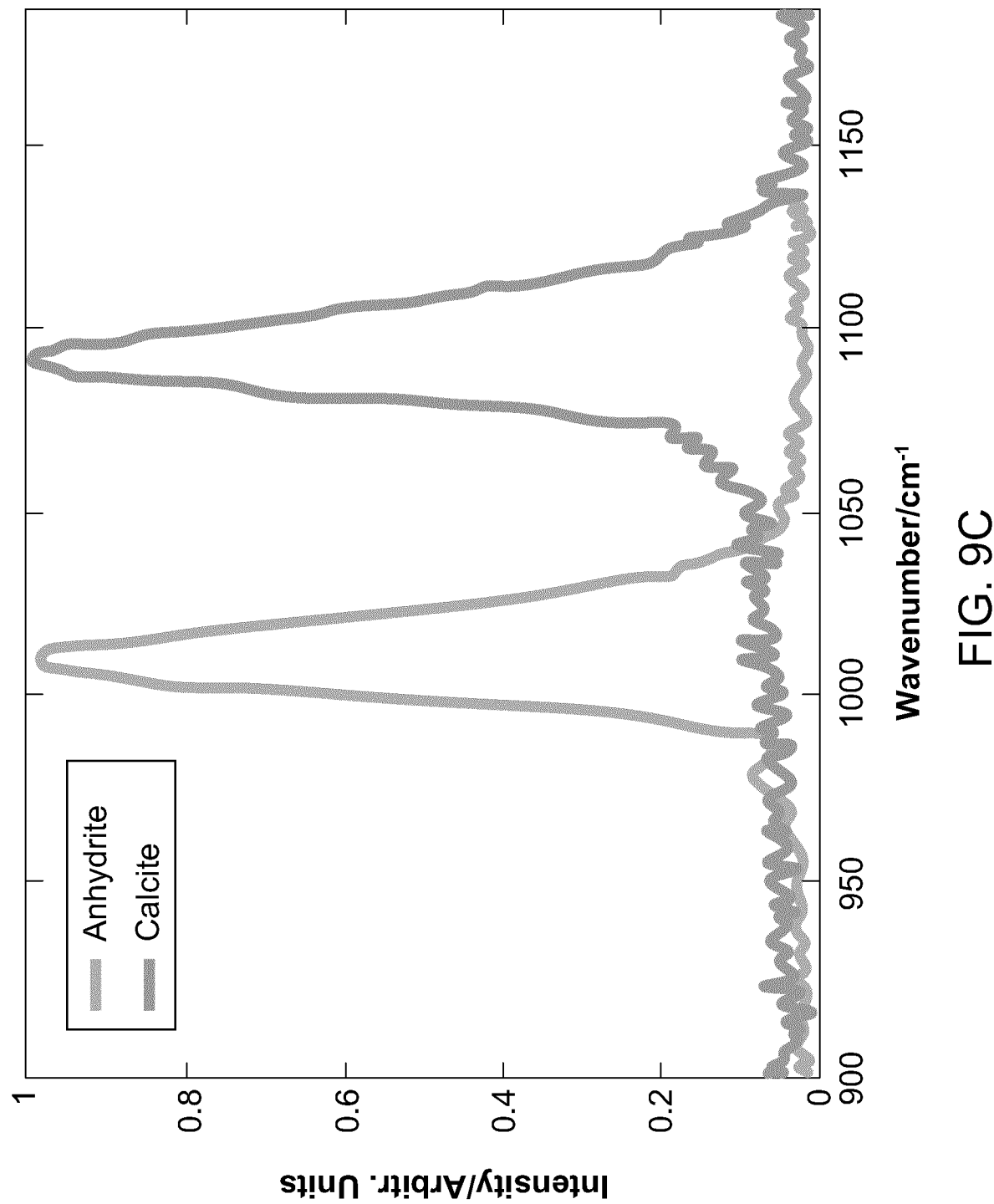
FIG. 9C shows the combined spectra of anhydrite and calcite on a normalized scale.
Figure 9D:
FIG. 9D is an image where the maximum intensity projection of the 3D volume SRS signal is shown, combined with the probed regions dominated by a non Raman-resonant contribution to the transfer of modulation optical response.
Figure 9F:
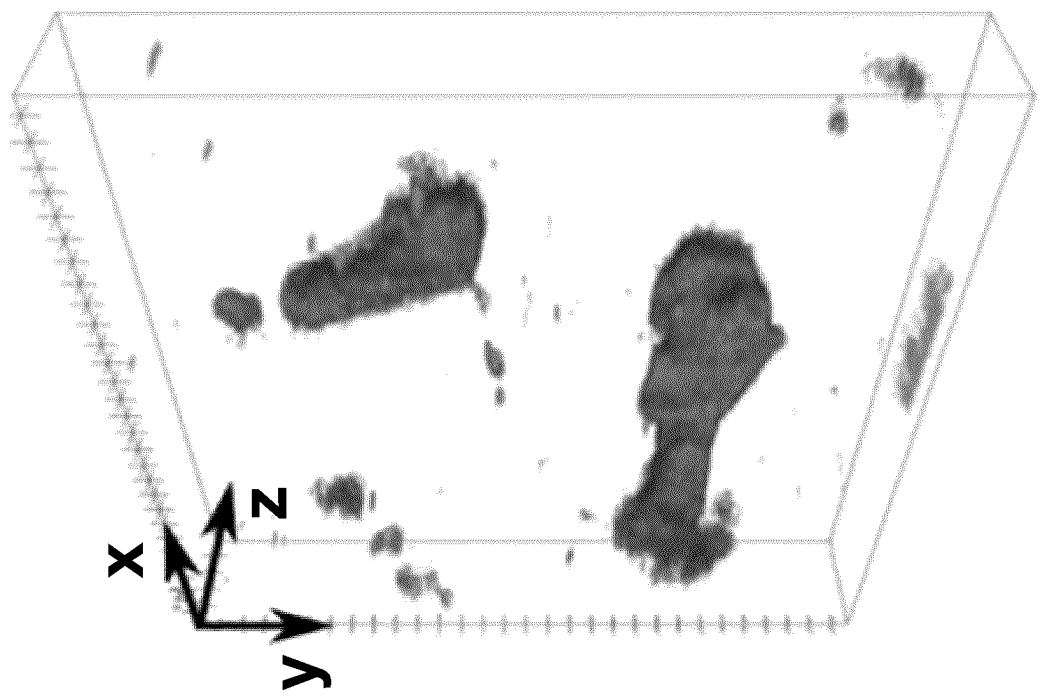
FIG. 9F is a 3D volume image of the anhydrite distribution.
Figure 9E:
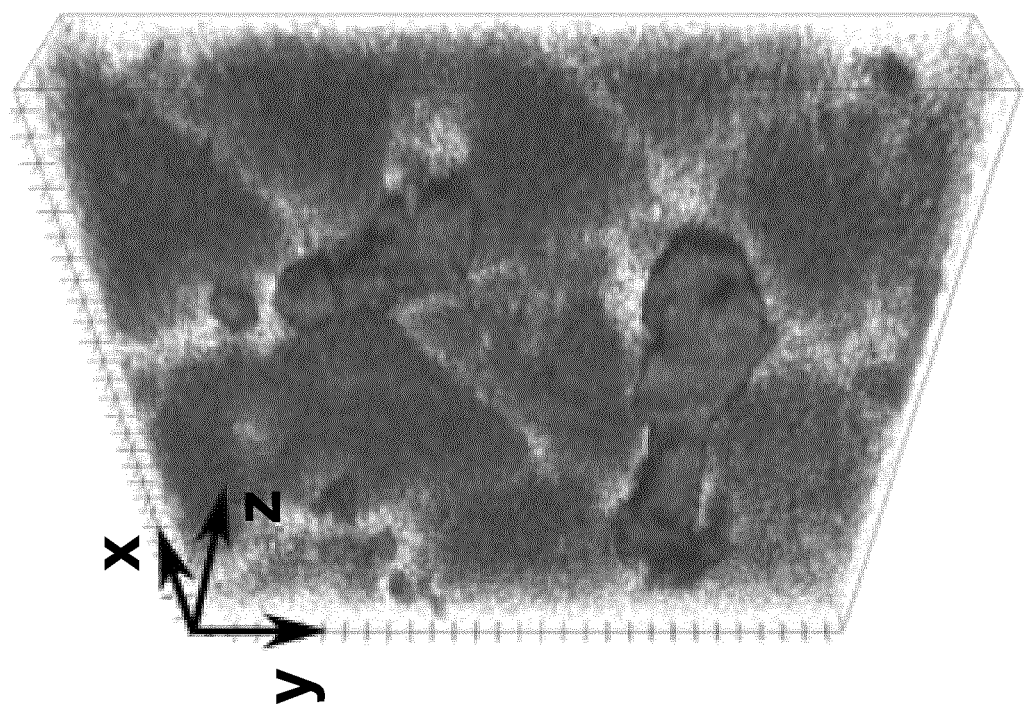
FIG. 9E shows the 3D volume of the sample mapping both minerals.

By way of example, in some embodiments the non Raman-resonant contribution to optical response may be useful to distinguish minerals having close lying Raman resonances. Referring to FIGS. 9A to 9F, the imaging process for a sample containing small anhydrite crystals embedded within a calcite crystal is illustrated. FIG. 9A, shows a bright-field transmitted light microscopy image of the sample area used for this analysis. Since anhydrite and calcite have Raman peaks within 100 cm$^{-1}$ of each other, by centering the pump laser wavelength at 937 nm using a spectral focussing technique such as described above both Raman peaks (calcite at 1088 cm$^{-1}$, anhydrite at 1017 cm$^{-1}$) can be investigated on a same spectrum. FIG. 9B, shows a SRS image where the resonant calcite signal has been color-coded in green and the anhydrite resonant signal in cyan. The recorded SRS spectra of these minerals are shown in FIG. 9(c), with the relevant probed regions being shown in FIG. 9B. In FIG. 9D, the maximum intensity projection of the 3D volume SRS signal is shown, giving a better view of the shape of the anhydrite samples, whereas FIG. 9E shows the 3D volume of the sample. FIG. 9D also shows in grey the probed regions dominated by a non Raman-resonant contribution to the transfer of modulation optical response. This contribution has been found to originate from thermal lensing (TL), as indicated by its presence in the lock-in amplifier quadrature channel. The TL signal is created by small absorbing particles which locally heat the sample. Finally, a 3D volume image of the anhydrite distribution is shown in FIG. 9F, revealing 3D anhydrite crystal shape and its boundaries.

As will be understood by one skilled in the art, a transfer of modulation resulting from any of the above non Raman-resonant processes is indicative of the presence of a species in the probed region, mineral or otherwise, which is not the target mineral species, that is, a non-target species.

In some embodiments, the chemical identity of the non-target species may be determined.

In some variants, the non Raman-resonant contribution observed on a given spectrum may be a known signature of a given material, from literature or from previous experiments on similar samples. In such cases, the determination of the chemical identity of the corresponding non-target species may be performed through a correlation of the spectrum with the known signature, for example through correlation methods such as listed above. In typical implementations, for a given mining operation a preliminary analysis of extracted materials may be performed using the present method combined with one or more of the additional techniques discussed below to identify and document the non Raman-resonant signatures of mineral and non-minerals present in the mine, and then use this information to determine the chemical species associated with the probed regions of the second set when subsequently analysing samples from the same mine.

In some variants, the spectrum obtained by probing a given probed region showing a non Raman-resonant contribution may be analysed for features characteristics of a given non-target species. For example, organics within the sample can be imaged by TPA and TPEF; low bandgap minerals such as pyrite, lead sulfide, hematite, magnetite and heavy minerals such as titanium dioxide, ilmenite, zircon and rare earth containing minerals can be imaged by TL and TPA.

Figure 6B:
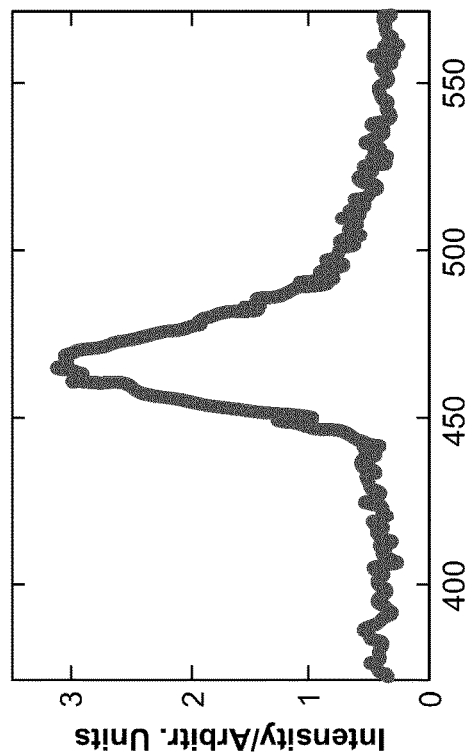
FIGS. 6B and 6C are SRS spectra of calcite and quartz, respectively.
Figure 6C:
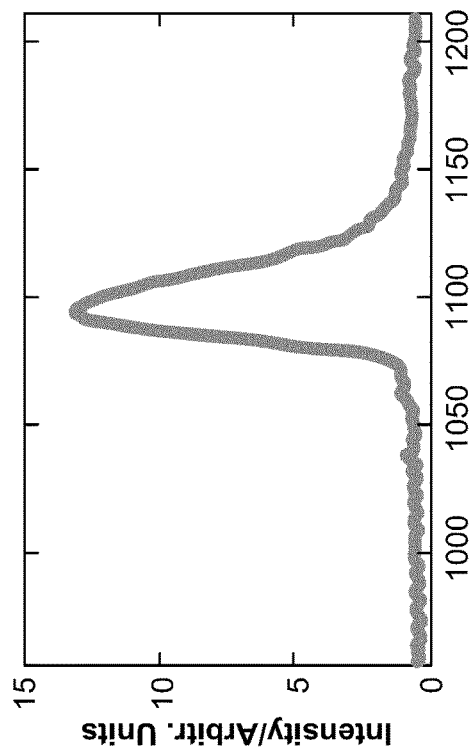
Figure 6A:
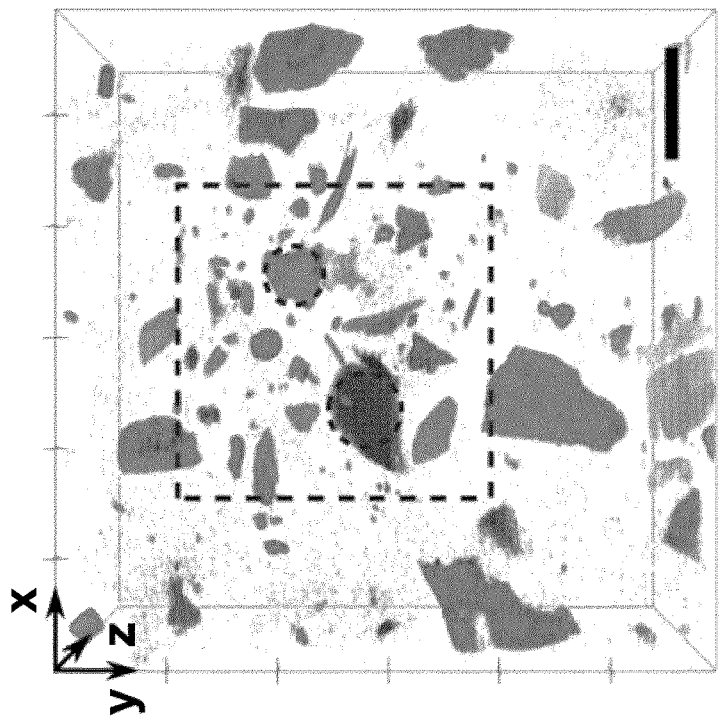
FIG. 6A is a 3D image of a sample containing quartz and calcite powders fixed in cyanoacrylate.
Figure 6E:
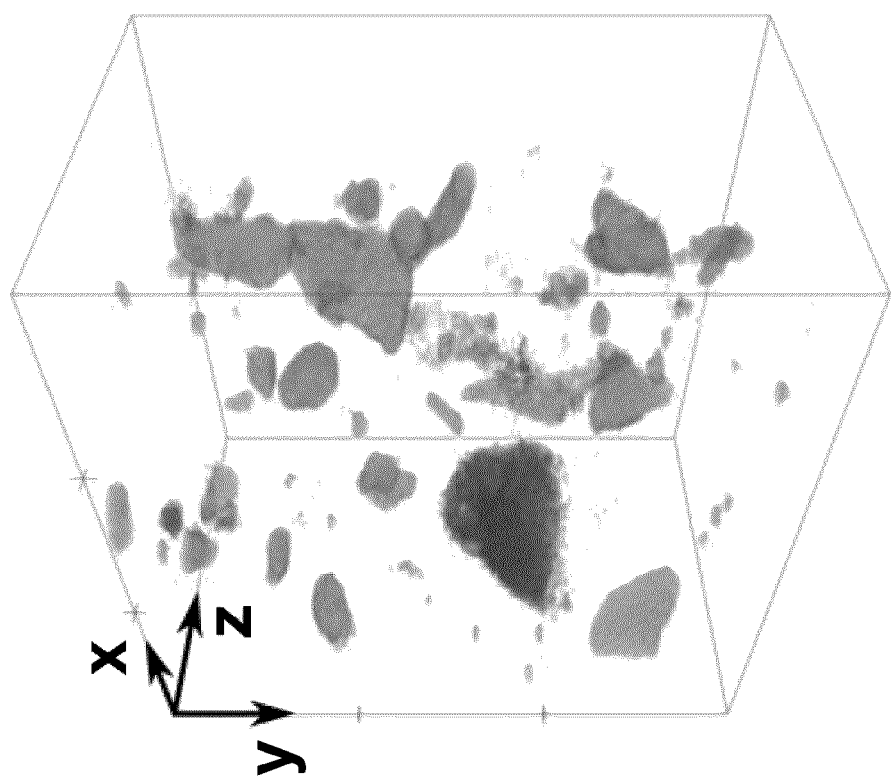
FIGS. 6D and 6E, shows a sub-region of the image of FIG. 6A from two different angles of view.
Figure 6D:
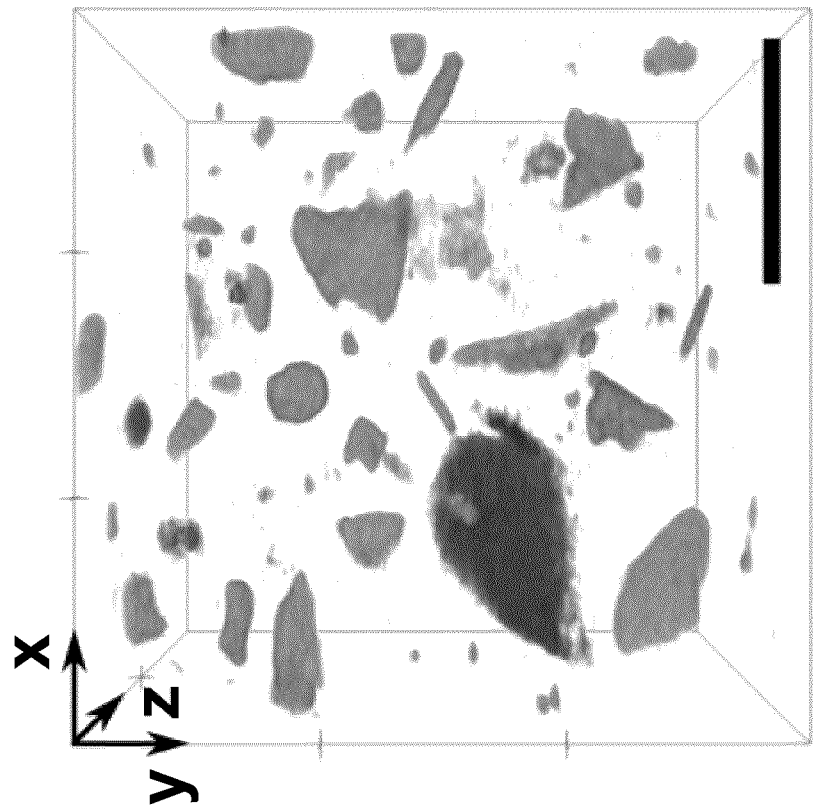

In other variants, the chemical identity of a non-target species may be determined through SRS-type experiments based on the known Raman spectrum of mineral species other than the target mineral species. Referring for example to FIGS. 6A to 6E, there are shown images obtained from modulation transfer imaging of a sample containing a mixture of two minerals, quartz and calcite, as powders. FIG. 6A shows a 3D image of quartz (red) and calcite (green) powders fixed in cyanoacrylate, with grain sizes ranging from a few microns to a few hundred microns. Calcite and quartz show sharp Raman peaks at 1088 and 466 cm$^{-1}$, respectively, as revealed by their SRS spectra in FIGS. 6B and 6C. In FIGS. 6D and 6E, a sub-region of the image of FIG. 6A is shown from two different angles of view. This example shows that small crystals of quartz and calcite, only a few micrometers in diameter, can be both spatially resolved and simultaneously chemically identified and imaged.

Alternatively, additional testing of one or more probed region of the second set may be done to identify the non-target species therein. For example, optical probing of the sample for the purpose of detecting and collecting directly generated signals filtered by wavelength and/or direction of propagation may be done. Optical modalities of this category known to those skilled in the art include Second Harmonic Generation (SHG), Third Harmonic Generation (THG), Two Photon Excited luminescence or Fluorescence (TPEF) and Coherent Anti-Stokes Raman Scattering (CARS).

Figure 7B:
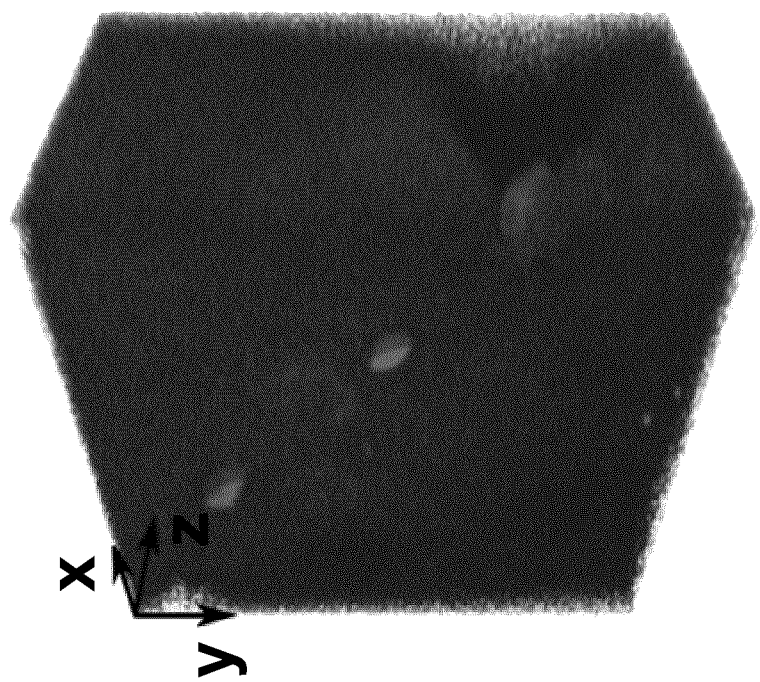
FIGS. 7A and 7B are respectively a 2D and a 3D image of a sample containing $CH_4$-rich fluid inclusions in quartz.
Figure 7A:
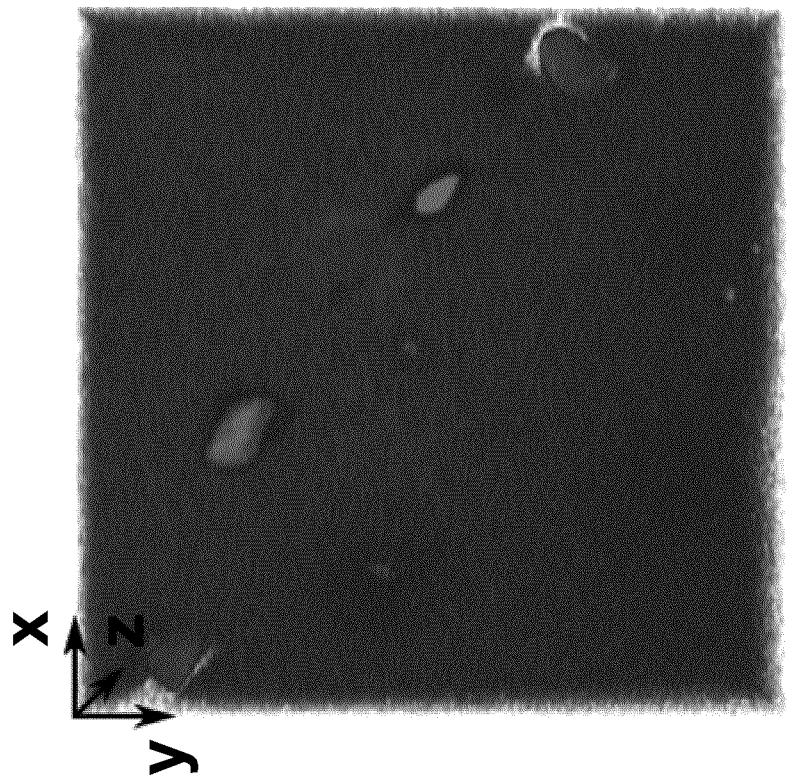
Figure 7D:
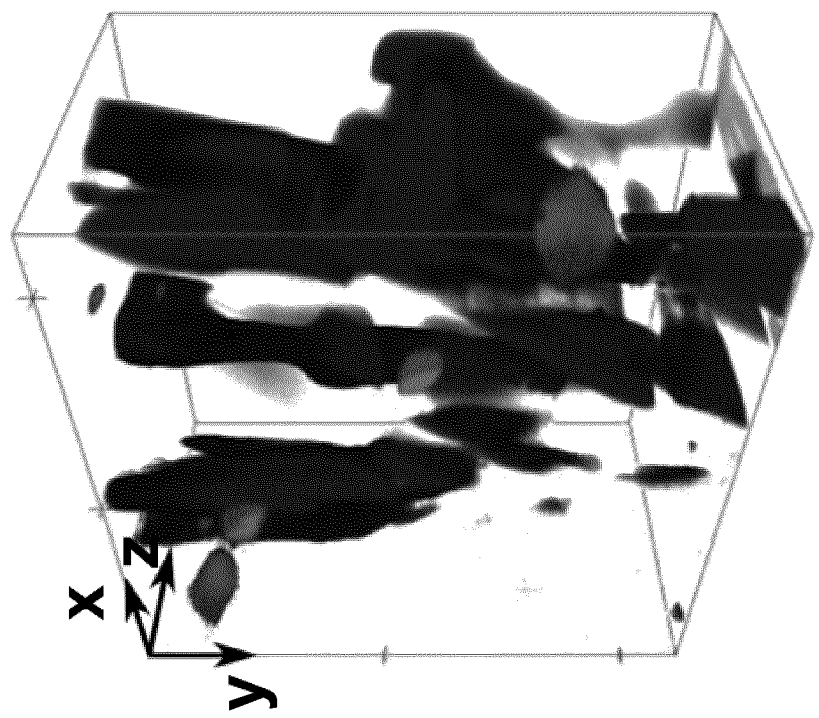
FIGS. 7C and 7D are composite images of the sample from two different angles of view, combining the mapping of the $CH_4$ inclusions obtained through SRS with acquired SHG signal from the quartz.
Figure 7C:
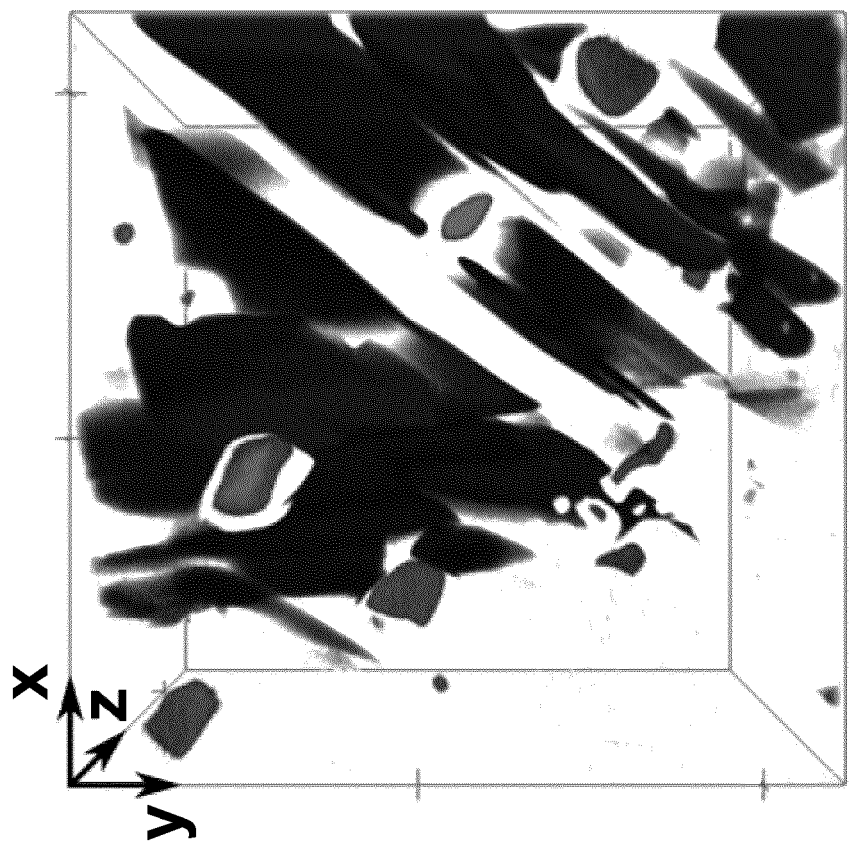

SHG is a parametric second order nonlinear optical process involving two photons of the same optical frequency. Because SHG phase matching cannot take place within centrosymmetric (e.g. isotropic) media, the presence of a signal indicates the presence of materials where centrosymmetry is locally broken. This approach can for example provide information on materials that are inherently non-centrosymmetric (e.g. quartz, some clay minerals etc.), as well as on interfaces between different media or grain boundaries/defects. In addition to allowing the chemical identification of a species, SHG may provide additional valuable information in other properties of the sample constituents. By way of example FIGS. 7A to 7D show images obtained through an embodiment of the present method combined with SHG. FIGS. 7A and B show a 2D and 3D image of a sample (112×112×68 μm) obtained from SRS signals from CH$_4$-rich fluid inclusions (magenta) and quartz (red), highlighting the location of fluid inclusions within the sample. In this example, one of the two species was located via the non Raman-resonant contribution (e.g. TL or XPM) to the modulated signal which contains Raman spectrum of the other mineral. This non Raman-resonant contribution can be identified using other methods or by SRS spectroscopy in other regions of the Raman spectrum. It is worth noting that FIG. 7B shows the presence of darker regions having a weaker SRS signal "behind" the methane fluid inclusions. This is caused by a slight modification of the beam divergence due to propagation through the fluid inclusion, yielding a slightly smaller detected SRS signal. While the SRS signal may chemically identify the volume occupied by quartz, it fails to provide any additional information about its local structure. FIGS. 7C and 7D show 3D images of SRS from CH$_4$-rich fluid inclusions (magenta) and the simultaneously acquired SHG signal from the quartz (blue). As can be observed, the SHG signal generated by the quartz-occupied probed regions are very different from the SRS signal generated by quartz. Quartz is a non-centrosymmetric material, weakly allowing the generation of second harmonic signals. However, due to the Gouy phase shift, most of SHG signal is cancelled in a bulk uniform sample. Indeed, the Gouy phase shift causes the SHG signal generated in front of and behind the focal plane to be out of phase, cancelling each other by destructive interference. However, at an interface or at a twin plane, a break in symmetry occurs: the SHG generation along the focus is no longer cancelled, giving rise to a detectable SHG signal. SHG can therefore give information about the local crystallite structure, such as the presence and orientation of twinning, which complements the information provided by SRS microscopy.

Figure 8B:
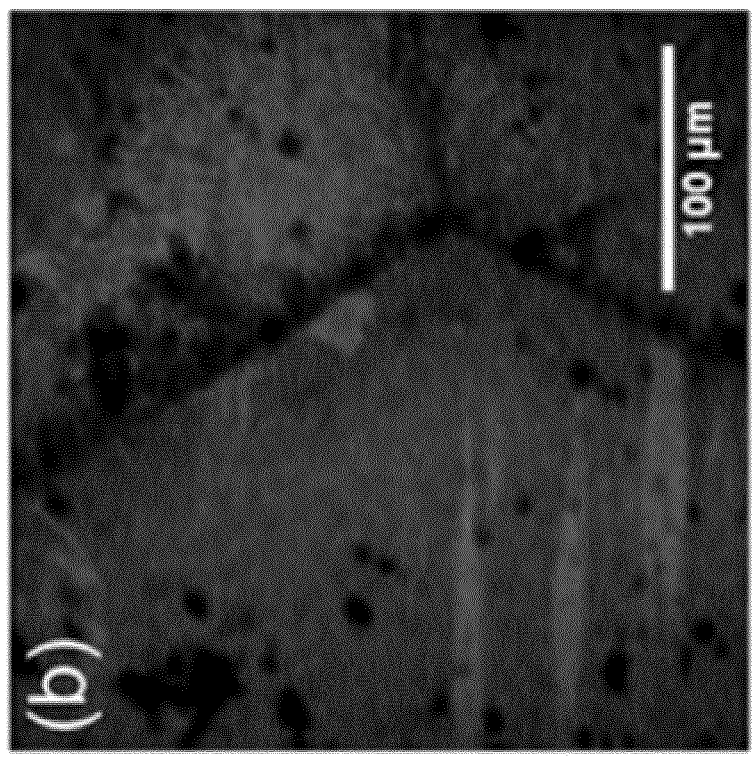
FIG. 8B is an image showing the presence of quartz as obtained through SRS, on which has been superposed an SHG signal generated only in specific probed regions.
Figure 8A:
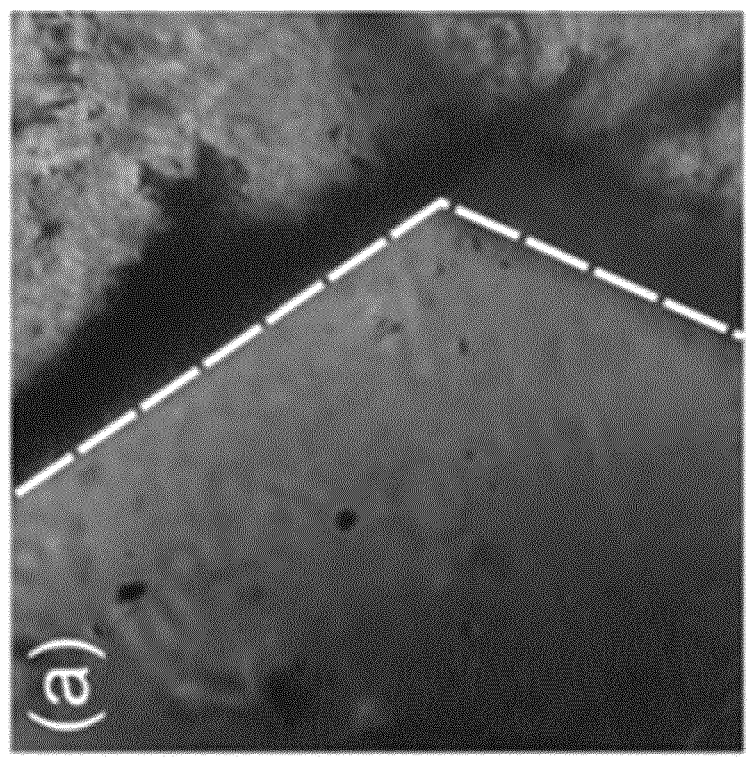
FIG. 8A is a bright-field transmitted-light microscopy image of an area of the sample containing quartz.
Figure 8C:
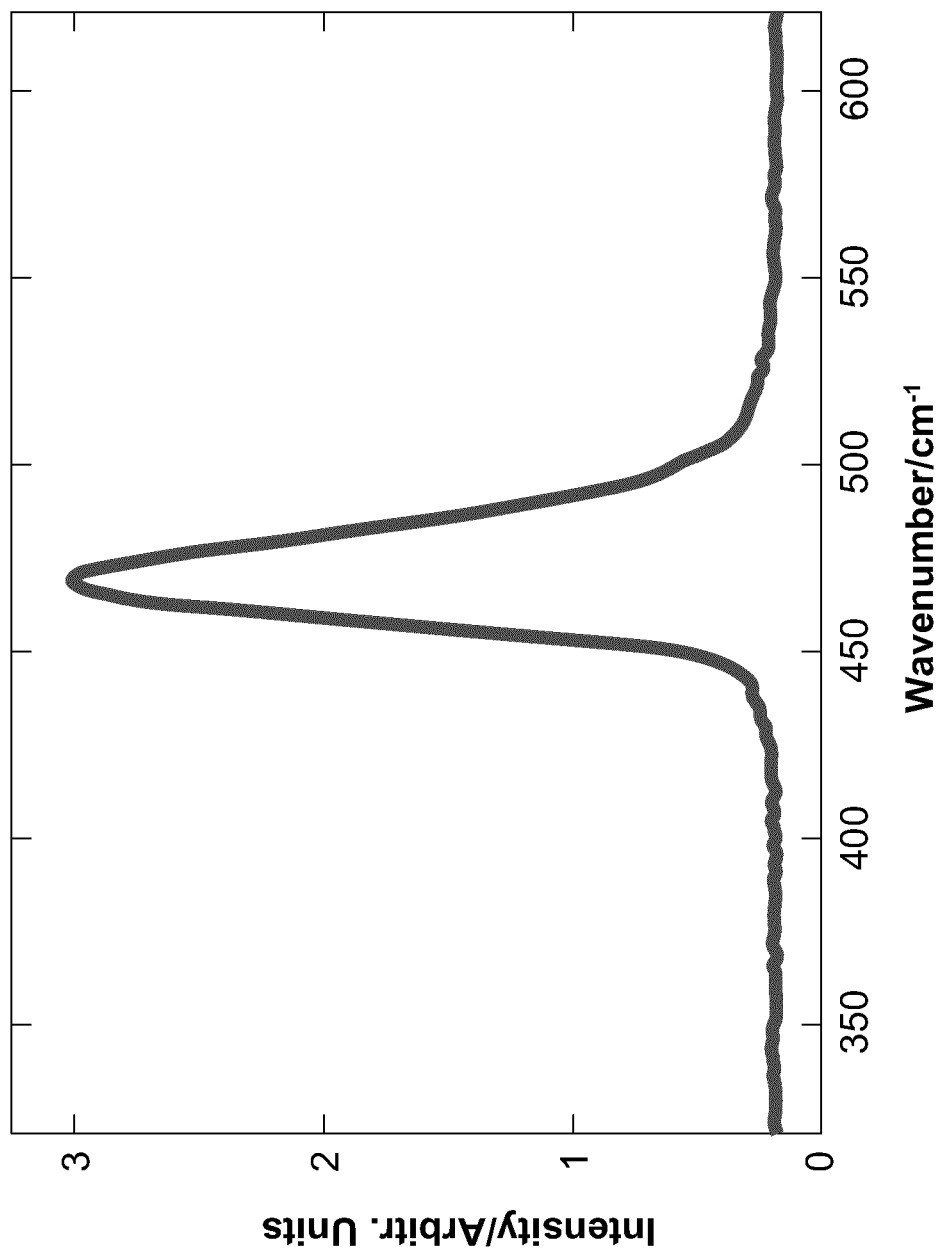
FIG. 8C is a spectrum of a probed region showing a quartz Raman resonance.
Figure 8E:
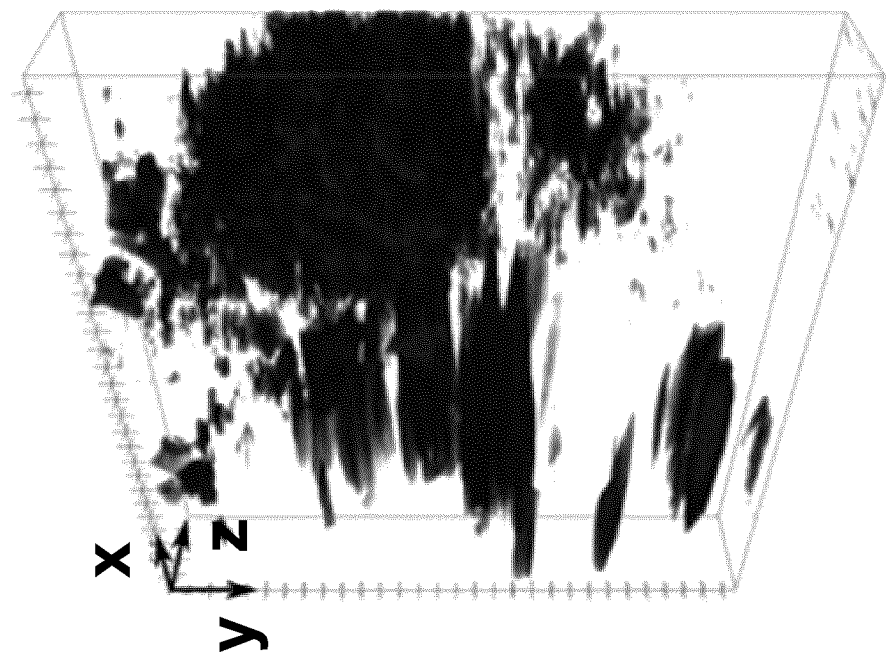
FIGS. 8D and 8E are 3D representations of the quartz in the sample highlighting the features created by the SHG signal, from two different angles of view.
Figure 8D:
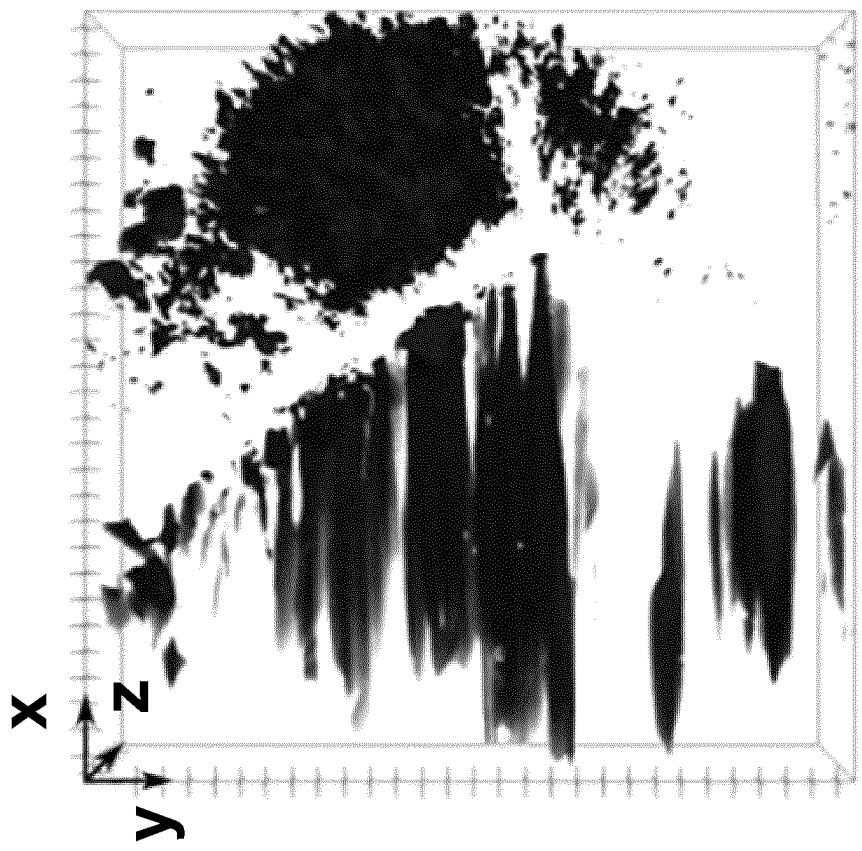
Figure 8F:
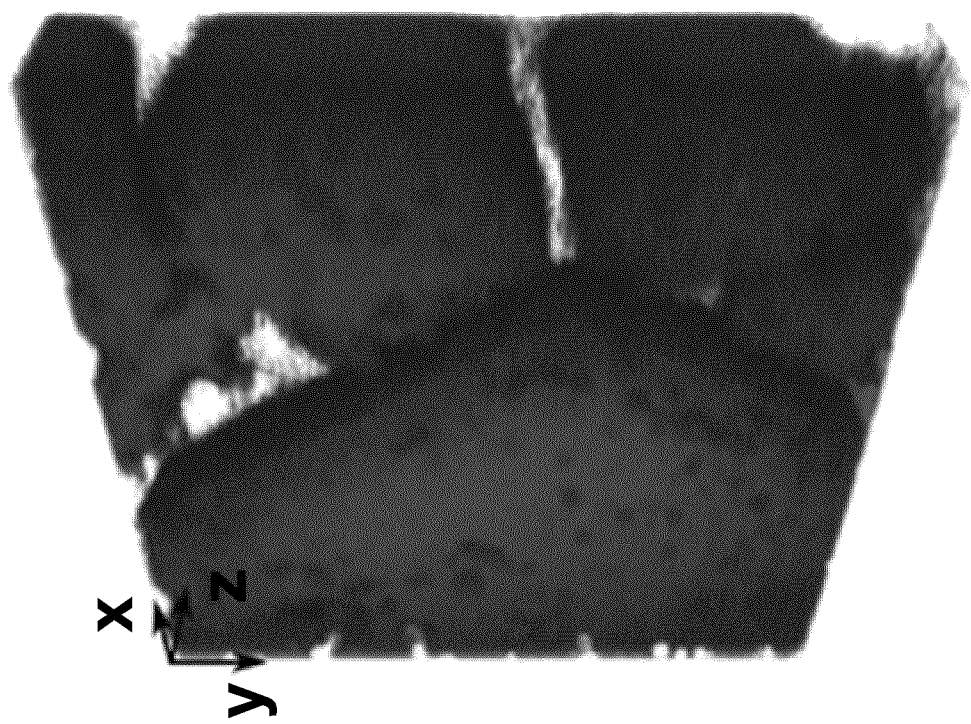
FIG. 8F is a 3D representation of the quartz as obtained using SRS microscopy alone.

FIGS. 8A to 8F show images of another embodiment combining SRS and SHG microscopy to image a mineral sample. In this example, the sample under study was a quartz sample from a metallic ore deposit in which a relatively large single crystal of quartz was overgrown by microcrystalline chalcedonic quartz. The bright-field transmitted-light microscopy image of the area of the sample is shown in FIG. 8A and an exemplary SRS spectrum of a probed region containing a Raman resonance associated with quartz is shown in FIG. 8C. In FIG. 8B, an image is shown of the 3D volume indicating the presence of quartz over the whole sample area as obtained through SRS, on which has been superposed an SHG signal generated only in specific probed regions. A 3D volume of the sample from two different angles highlighting the different features created by the SHG signal is shown in FIGS. 8D and 8E. On the left side of the image, the SHG signal reveals elongated, parallel Brazil twinning whereas on the right side of the image, the speckle-like structure of the SHG signal can be associated with different optical orientations of microcrystals within the chalcedony. These structures are not seen using SRS microscopy alone (FIG. 8F), as it only displays the volume occupied by quartz, chemically identified by its Raman spectrum, but not its crystallinity.

TPEF investigations can also be used to identify the non-target species. In TPEF, some emissions are narrow and diagnostic (e.g. rare earth doped minerals). There are many fluorescent mineral varieties. Fluorescence in minerals is usually the result of the presence of impurities. Some minerals are much more likely to be fluorescent than others. By way of example, such a modality may be useful to distinguish different carbonate minerals which the 1080 band may not be sufficient to classify. Furthermore, the presence of fluorescence may provide additional evidence of mineral types. An example of the use of fluorescence to distinguish dolomite from ankerite in a particular application can for example be found in Morad, S. (Ed.). (2009) *Carbonate Cementation in Sandstones: Distribution Patterns and Geochemical Evolution* (Special Publication 26 of the IAS)(Vol. 72). John Wiley & Sons. Pg 67. This modality is also diagnostic of higher organics (e.g. petroleum species).

CARS is based on Raman vibrational spectroscopy. As in SRS, in CARS the frequency difference between a pump beam and Stokes beam is varied to find a Raman resonance of the sample. Unlike SRS, it is the intensity of the light generated by the probed region of the sample which is detected and analysed for Raman resonances. CARS may for example be applied applies to minerals and to inclusions such as trapped organic fluids or gases.

In yet another set of variants, the chemical nature of the non-target species may be determined through the application of other mineralogical techniques to characterize the sample.

For example, optical microscopy (in transmitted and reflected light) may be used to qualitatively identify minerals and observe mineralogical composition and textural features at a glance, which provides a good first assessment of the physical association of minerals within the sample. X-ray diffraction is also a powerful technique used in mineralogy, as it allows an accurate quantitative assessment of the mineral suite contained in a sample. Automated mineralogy techniques based on scanning electron microscopy (SEM) are also widely used in the industry. Such SEM-based techniques include: MLA (Mineral Liberation Analyzer), QEMSCAN (Quantitative Evaluation of Minerals by SCANnning electron microscopy), TIMA (TESCAN Integrated Minerals Analyzer) or others. MLA is based solely on imaging the intensity of Back-Scattered Electron (BSE) signals emitted upon impinging an electron beam on the sample by SEM. QEMSCAN combines imaging by BSE with energy-dispersive X-ray spectroscopy (referred to as EDS, EDX or EDXS). TIMA combines SEM-based imaging by BSE and EDX with a detector to measure cathodoluminescence visible light emitted as a result of impinging the electron beam on the sample. Other spectroscopic techniques, such as infrared (IR), near infrared (NIR), Raman and Mössbauer spectroscopy, may also be used to identify some of the mineral species present in a sample. Finally, quantitative analysis of the bulk elemental/chemical composition of the sample is routinely achieved by combining inductively coupled plasma (ICP) optical/atomic emission spectroscopy (OES/AES), X-ray fluorescence (XRF) spectrometry, and light element analysis (carbon, hydrogen, nitrogen and sulphur). As will be readily understood by one skilled in the art, proper sample preparation techniques are important for the reliable application of the other mineralogical techniques described above. Indeed, all of the techniques described above typically require extensive sample preparation in order for the measurements acquired by those techniques to yield accurately the mineralogical and chemical composition of the sample. An advantage of the present method is that it can be applied directly to a sample without any sample preparation.

In some embodiments, the present method may involve identifying more than one target mineral species using the SRS methodology, irrespectively of their potential non Raman-resonant contribution. In some cases, additional target mineral species may have a Raman resonance in the same spectrum as the Raman resonance used to identify the initial target species, such as calcite and anhydrite crystals in the example of FIG. 9C. In such embodiments, the method may involve identifying the one or more additional subsets of the probed regions containing an additional mineral species, through a correlation of the corresponding spectrum with at least one known Raman resonance of the additional mineral species within the same frequency range. The additional subsets of the probed regions may then be mapped on the image along with the probed regions representing the initial target mineral species. In other variants, Raman resonances characteristic of the additional target mineral species may be found in a different frequency range than the Raman resonance used to identify the initial target mineral species, such as for example shown in FIGS. 6B and 6C for calcite and quartz. In such cases, the method may involve repeating the steps of probing the sample for each additional mineral species and identifying first and second probed regions as explained above, thereby identifying an additional subset of the probed regions containing the additional mineral species, which can be mapped on the image.

Figure 10:
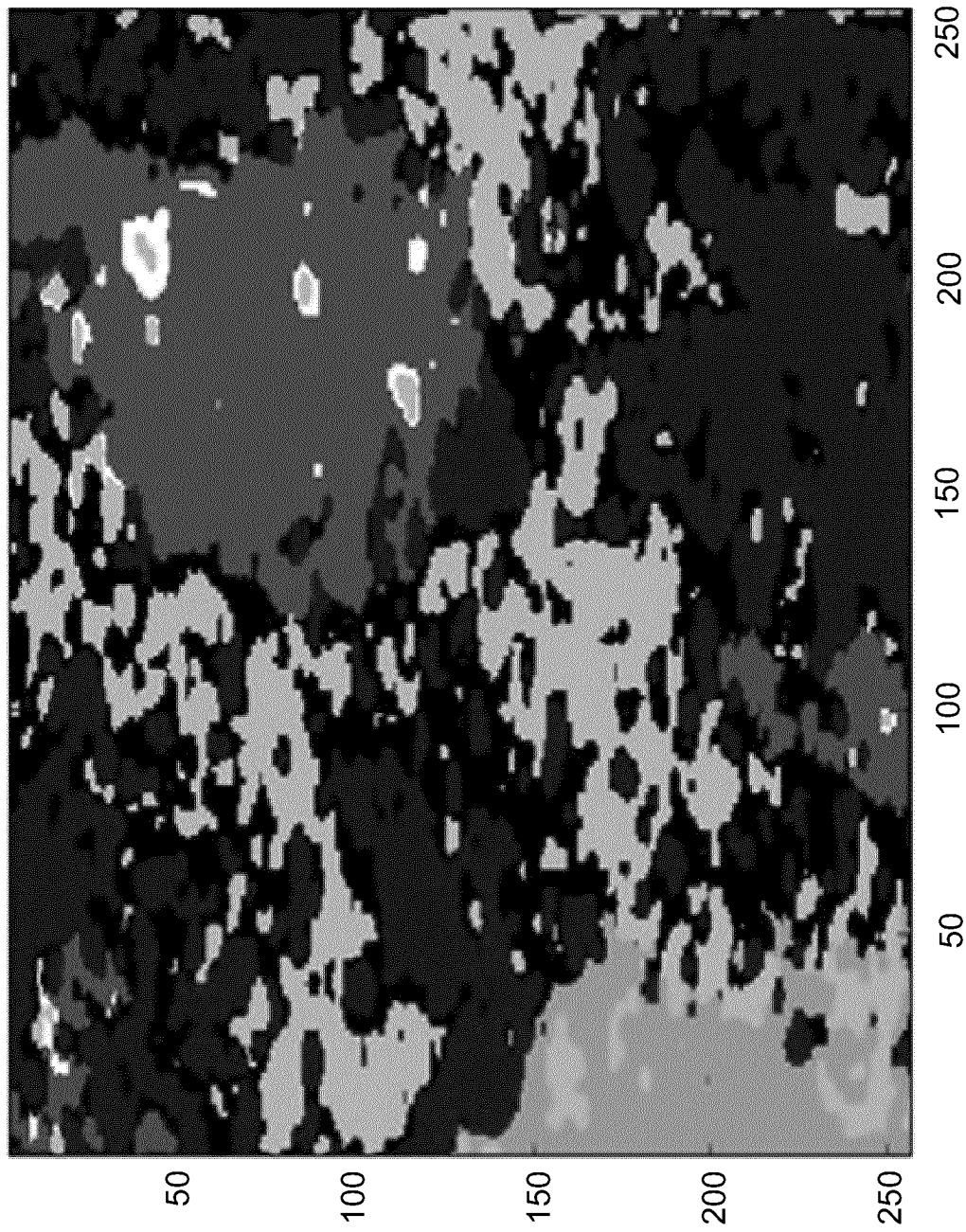
FIG. 10 is a colored 2D image of a carbonatite rock sample obtained by mapping different spectral responses and classifying them.
Figure 10A:
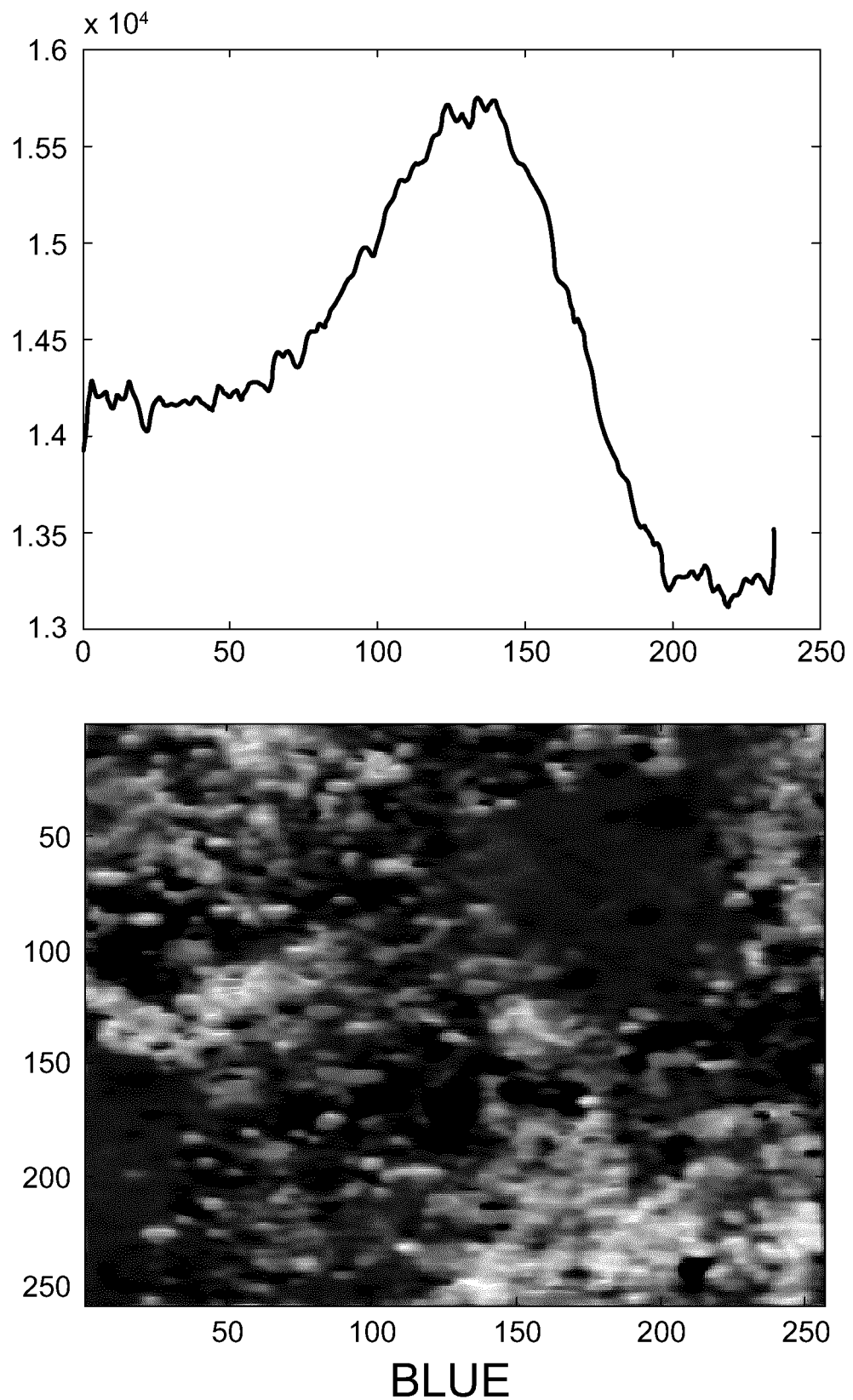
FIGS. 10A through 10D show characteristic spectra of the four main spectral shapes observed in the sample.
Figure 10B:
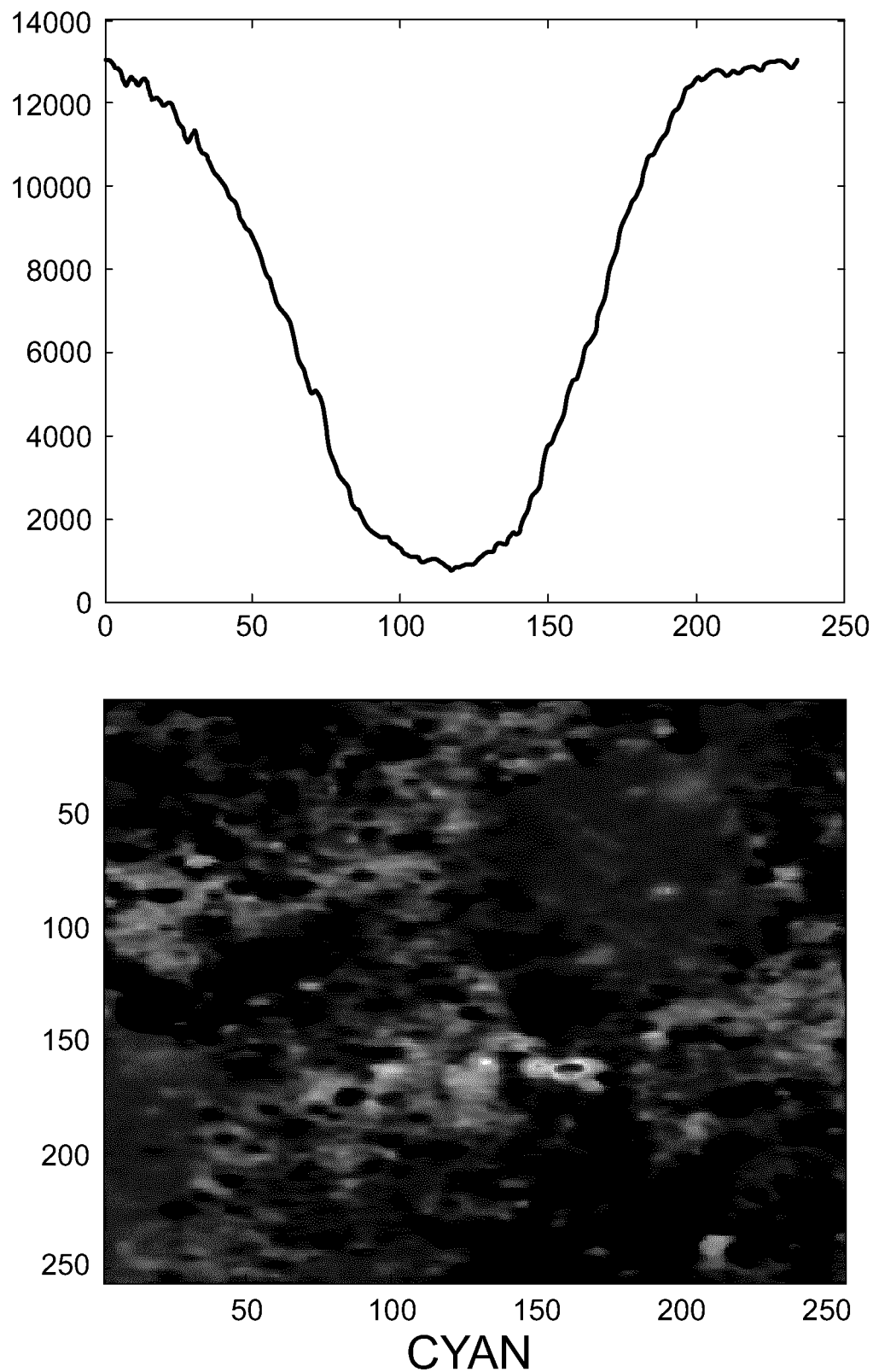
Figure 10C:
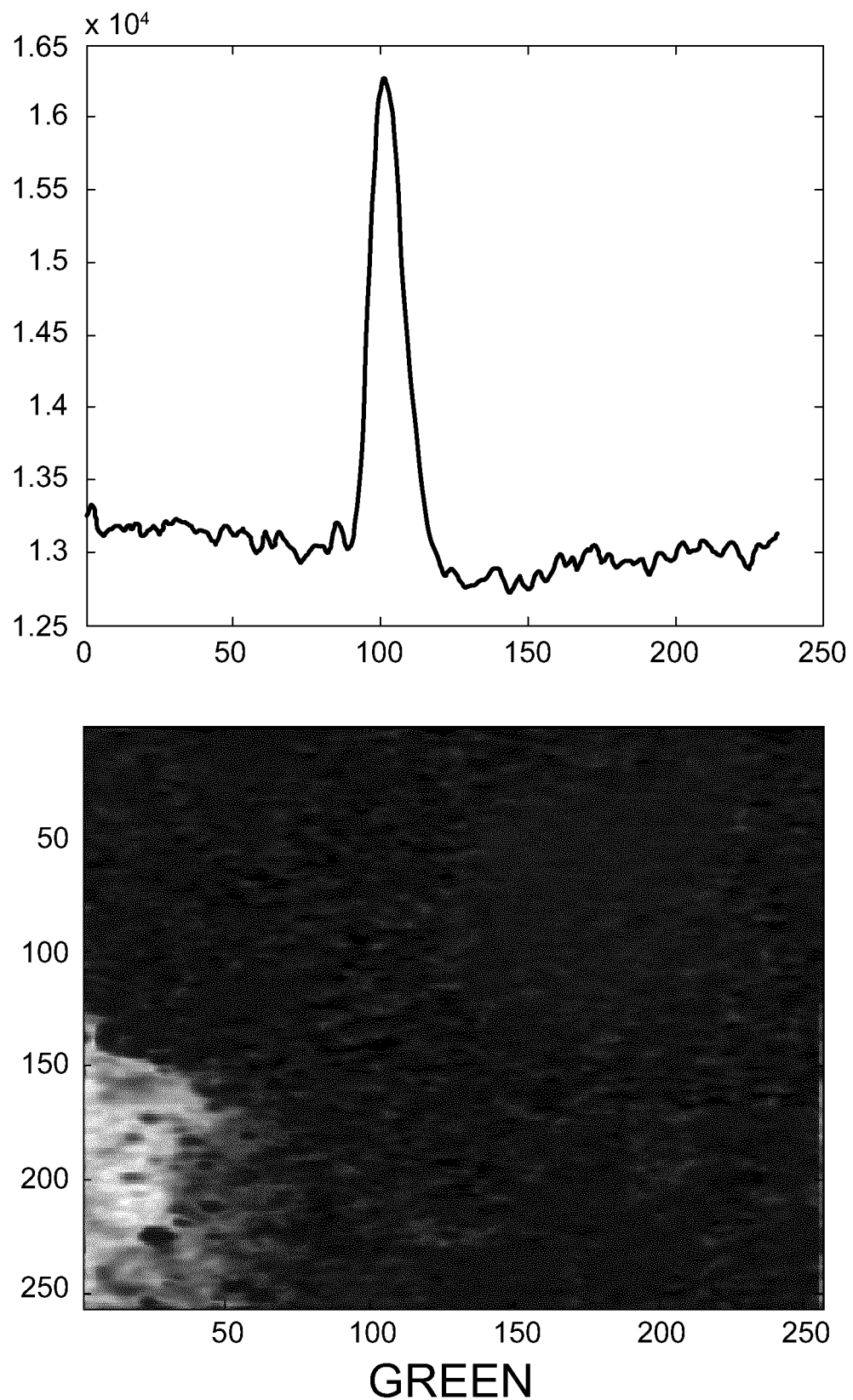
Figure 10D:
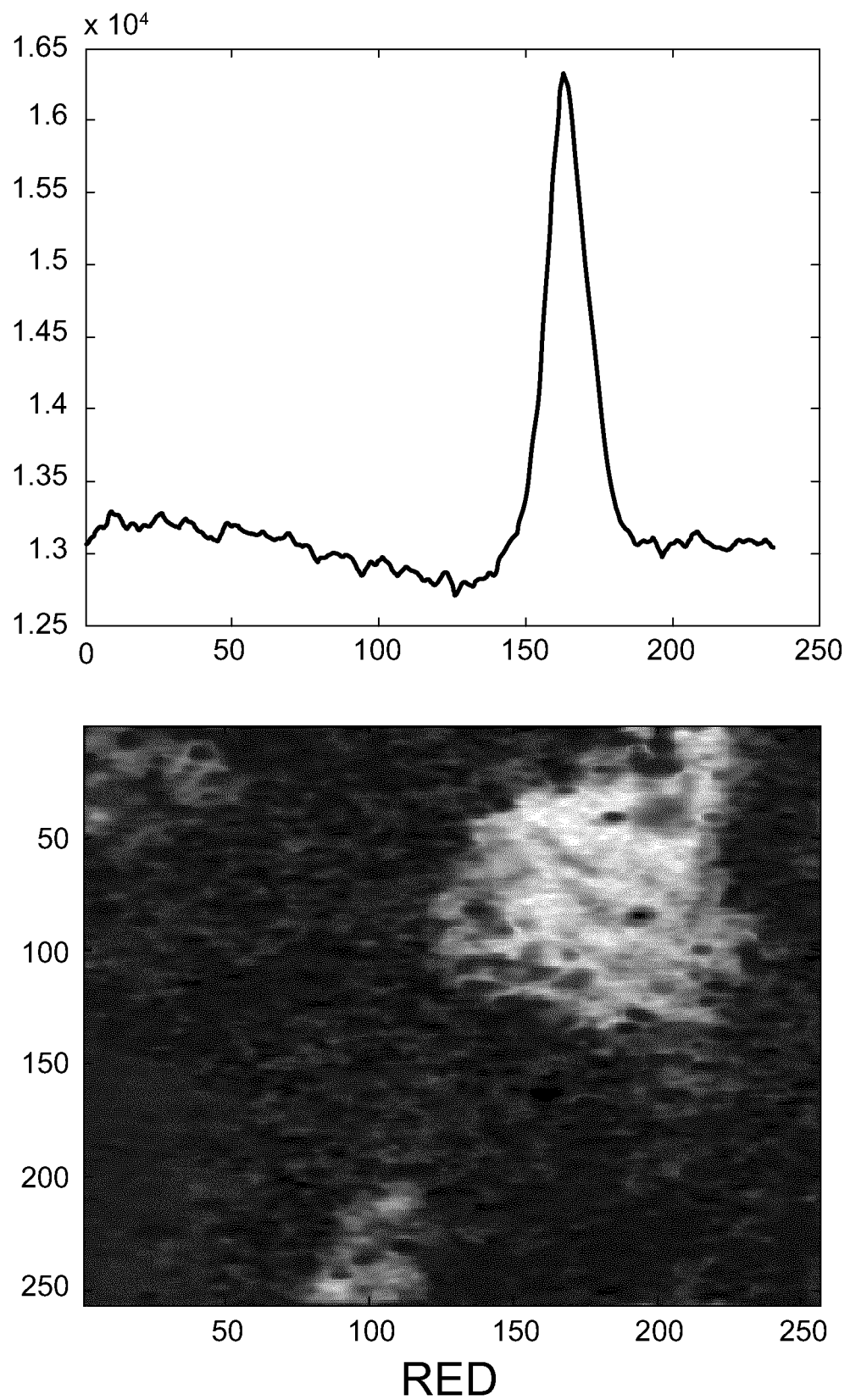

Finally, FIG. 10 presents the imaging of a carbonatite rock sample obtained by mapping different spectral responses and classifying them. Probed regions of the carbonatite rock sample can be shown to have one of four main spectral shapes shown in FIGS. 10A to 10D, either due to SRS contributions or to non Raman-resonant contributions to the modulation transfer signal. In this case color assignment is determined by a threshold response to a classification algorithm. Even if the mineral origin of the signals corresponding to the various non-Raman resonant contributions are unidentified or unknown, the false-color image that is shown may nonetheless be useful to ascertain rock textural relationships among the various mineral phases occurring within this sample.

Of course, numerous modifications could be made to the embodiments described above without departing from the scope of the invention as defined in the appended claims.

The invention claimed is:

1. A method of imaging a sample containing a target mineral species and other constituent species, the method comprising:
   a) generating a pump beam and a Stokes beam comprising of a train of short pulses and having a tunable optical frequency difference;
   b) imposing a modulation on one of the pump beam and Stokes beam;
   c) probing an array of probed regions of the sample with the pump beam and Stokes beam jointly, said probing comprising varying the optical frequency difference between the pump beam and Stokes beam over an optical frequency range encompassing at least one known Raman resonance of the target mineral species, said probing further comprising detecting, for each frequency of said optical frequency range for each of the probed regions of said array, an optical response of the sample resulting from a transfer of said modulation between the pump beam and the Stokes beam, thereby obtaining hyperspectral data of said optical response over said optical frequency range for each of the probed regions;
   d) identifying a first subset of the probed regions containing the target mineral species through a correlation of the hyperspectral data with the at least one known Raman resonance of the target mineral species;
   e) identifying a second subset of the probed regions containing one of the other constituent species through a correlation of the hyperspectral data with a non Raman-resonant contribution to said optical response;
   f) building an image of the sample by mapping the first and second subsets of the probed regions thereon.

2. The method according to claim 1, wherein the array of probed regions of the sample is a bi-dimensional spatial array.

3. The method according to claim 1, wherein the array of probed regions of the sample is a tri-dimensional spatial array.

4. The method according to claim 1, wherein the probing of step c) comprises the substeps of:

probing one of the probed regions of said array with the pump beam and Stokes beam;

varying the optical frequency difference between the pump beam and Stokes beam over said optical frequency range and detecting said optical response of the sample; and spatially scanning the pump beam and Stokes beam over said sample and repeating the substeps of probing one of the probed region and varying the optical frequency difference for each of the remaining probed regions of said array.

5. The method according to claim 1, wherein the probing of step c) comprises the substeps of:

fixing the optical frequency difference between the pump beam and Stokes beams to said at least one known Raman resonance of the mineral species;

spatially scanning the pump beam and Stokes beam over the array of probed regions and detecting said optical response of the sample; and spectrally scanning the optical frequency difference over said optical frequency range and repeating the substeps of fixing the optical frequency difference to said at least one known Raman resonance and spatially scanning the pump beam and Stokes beam for each optical frequency difference within said optical frequency range.

6. The method according to claim 1, wherein step of building an image comprises assigning respective first and second colors to the first and second subsets of the probed regions.

7. The method according to claim 1, comprising a step of determining a chemical identity of said one of the other constituent species.

8. The method according to claim 7, wherein the step of determining a chemical identity of said one of the other constituent species comprises a step of predetermining said chemical identity from a similar sample using a non-imaging mineralogical technique, and associating the non Raman-resonant contribution said chemical identity.

9. The method according to claim 1, further comprising associating the non Raman-resonant contribution to said optical response with at least one of a cross-phase modulation (XPM) contribution, a thermal lensing (TL) contribution, and non-linear absorption contribution.

10. The method according to claim 9, wherein said non-linear absorption contribution is one of Two-Photo Absorption (TPA), Ground State Depletion (GSD) and Excited State Absorption (ESA).

11. The method according to claim 1, comprising:

identifying an additional subset of the probed regions containing an additional mineral species through a correlation of the corresponding spectrum with at least one known Raman resonance of the additional mineral species within said optical frequency range; and mapping the additional subsets of the probed regions on said image.

12. The method according to claim 1, comprising repeating steps a) through e) for an additional mineral species, thereby identifying an additional subset of the probed regions containing the additional mineral species, and mapping the additional subsets of the probed regions on said image.

13. The method according to claim 1, wherein the modulation imposed on one of the pump beam and Stokes beam includes at least one of amplitude modulation, a polarisation modulation, a time delay, a frequency modulation or phase modulation.

* * * * *